(12) United States Patent
Yasuda

(10) Patent No.: US 8,084,899 B2
(45) Date of Patent: *Dec. 27, 2011

(54) DRIVING APPARATUS

(75) Inventor: Hiromu Yasuda, Yokohama (JP)

(73) Assignee: Canon Kabushiki Kaisha (JP)

( * ) Notice: Subject to any disclaimer, the term of this patent is extended or adjusted under 35 U.S.C. 154(b) by 131 days.

This patent is subject to a terminal disclaimer.

(21) Appl. No.: 12/538,415

(22) Filed: Aug. 10, 2009

(65) Prior Publication Data

US 2009/0295238 A1    Dec. 3, 2009

Related U.S. Application Data

(63) Continuation of application No. 11/460,496, filed on Jul. 27, 2006, now Pat. No. 7,573,164.

(30) Foreign Application Priority Data

Jul. 28, 2005   (JP) ................................. 2005-218968

(51) Int. Cl.
   *H02K 37/00* (2006.01)
(52) U.S. Cl. ................... 310/49.07; 310/49.19; 310/181
(58) Field of Classification Search .... 310/49.04–49.11, 310/49.15, 49.18–49.21, 49.37, 49.51, 216.074–216.077; 359/819, 822, 824, 827, 829
   See application file for complete search history.

(56) References Cited

U.S. PATENT DOCUMENTS

| | | | |
|---|---|---|---|
| 4,745,312 A | 5/1988 | Nagasaka | |
| 4,767,958 A * | 8/1988 | Sasaki | 310/257 |
| 5,719,452 A * | 2/1998 | Sugiura | 310/49.19 |
| 5,723,921 A * | 3/1998 | Sugiura | 310/49.19 |
| 5,831,356 A * | 11/1998 | Aoshima | 310/49.04 |
| 5,925,945 A * | 7/1999 | Aoshima | 310/49.09 |
| 6,172,440 B1 * | 1/2001 | Sasaki et al. | 310/156.38 |
| 6,304,010 B1 | 10/2001 | Sugiura | |
| 6,417,594 B1 * | 7/2002 | Kometani et al. | 310/261.1 |
| 6,798,093 B2 | 9/2004 | Aoshima | |
| 6,800,970 B2 | 10/2004 | Aoshima | |
| 6,876,109 B2 * | 4/2005 | Matsushita et al. | 310/49.08 |
| 7,173,352 B2 * | 2/2007 | Aoshima | 310/49.21 |
| 7,224,091 B2 * | 5/2007 | Yasuda | 310/49.37 |
| 7,573,164 B2 * | 8/2009 | Yasuda | 310/181 |
| 7,626,291 B2 * | 12/2009 | Yasuda | 310/156.39 |

FOREIGN PATENT DOCUMENTS

| | | |
|---|---|---|
| JP | 62-163553 A | 7/1987 |
| JP | 1-180184 U | 12/1989 |

(Continued)

*Primary Examiner* — Tran Nguyen
(74) *Attorney, Agent, or Firm* — Rossi, Kimms & McDowell LLP

(57) ABSTRACT

A driving apparatus includes a first magnet, second magnet, stator, first coil, second coil, first bearing, second bearing and rotor. The first and second magnets respectively have a magnetized portion in which S pole and N pole are alternately magnetized. The rotor has a magnetic pole portion opposite to each magnetized portion. The stator fixes the first magnet and second magnet to the same axis to rotatably support the rotor. The first coil magnetically excites a portion where the magnetic pole portion of the rotor faces the first magnet. The second coil magnetically excites a portion where the magnetic pole portion of the rotor faces the second magnet. Thereby, a driving apparatus is provided which stabilizes the quality by simplifying the configuration of a rotor and makes it possible to realize high speed of rotation and improvement of response speed by decreasing the moment of inertia of a rotor.

2 Claims, 25 Drawing Sheets

FOREIGN PATENT DOCUMENTS

| | | |
|---|---|---|
| JP | 4-131183 U | 12/1992 |
| JP | 9-182405 A | 7/1997 |
| JP | 09-331666 A | 12/1997 |
| JP | 2002-051526 A | 2/2002 |

* cited by examiner

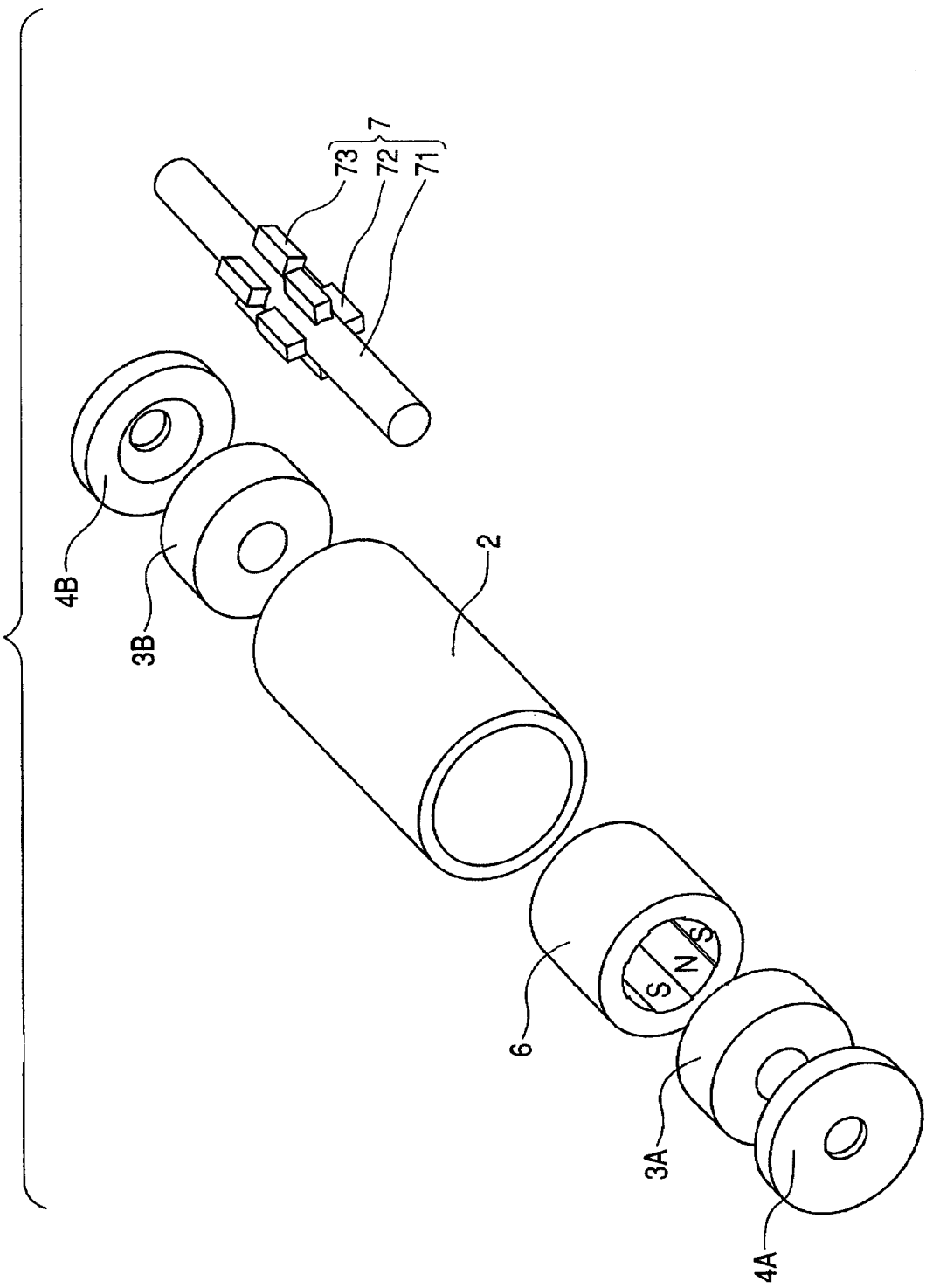

DRIVING APPARATUS

This is a continuation of and claims priority from U.S. patent application Ser. No. 11/460,496 filed on Jul. 27, 2006, the content of which is incorporated herein by reference.

BACKGROUND OF THE INVENTION

1. Field of the Invention

The present invention relates to a driving apparatus to be applied to a yoke-rotational stepping motor.

2. Related Background Art

Conventionally, a stepping motor has been widely used for driving sources of various mechanisms. As a first conventional example of the stepping motor, a stepping motor is proposed in which the diameter centering around a rotation axis is decreased and the output is raised (for example, refer to Japanese Patent Application Laid-Open No. H09-331666 (U.S. Pat. No. 5,831,356)).

FIG. 22 is an exploded perspective view showing a component of a stepping motor of a first conventional example. FIG. 23 is a sectional view showing the structure of an already-assembled stepping motor.

In FIGS. 22 and 23, the stepping motor is provided with a magnet 301, first coil 302, second coil 303, first stator 304, second stator 305, output shaft 306 and connecting ring 307. The magnet 301 is formed like a cylindrical shape, divided into four parts in the circumferential direction and alternately magnetized to different polarities. The first stator 304 is magnetically excited by the first coil 302. The second stator 305 is magnetically excited by the second coil 303.

The stepping motor having the above configuration changes polarities of the first outside magnetic pole portions 304A and 304B, first inside magnetic pole portions 304C and 304D, second outside magnetic pole portions 305A and 305B and second inside magnetic pole portions 305C and 305D by changing the electrifying directions for the first coil 302 and second coil 303. Thereby, a rotor constituted of the magnet 301 and output shaft 306 is rotated. In this case, the magnet 301 is attached to the output shaft 306 with an adhesive or the like.

In the case of this stepping motor, a magnetic flux generated by electrifying the first coil 302 and second coil 303 flows to an opposite inside magnetic pole portion from an outside magnetic pole portion or opposite outside magnetic pole portion from an inside magnetic pole portion and efficiently acts on the magnet 301 located between the outside magnetic pole portion and the inside magnetic pole portion. Moreover, it is possible to set the distance between the outside magnetic pole portion and the inside magnetic pole portion to approximately the thickness of the cylindrical-shaped magnet 301. Therefore, it is possible to decrease the resistance of a magnetic circuit constituted of an outside magnetic pole and inside magnetic pole. Therefore, it is possible to generate more magnetic flux with a small current as the resistance of a magnetic circuit decreases and an output of the stepping motor is improved.

Moreover, as a second conventional example of a stepping motor, a hollow cylindrical-shaped stepping motor is proposed (for example, refer to Japanese Patent Application Laid-Open No. 2002-51526 (U.S. Pat. No. 6,798,093 and U.S. Pat. No. 6,800,970). When mounting the stepping motor of this type on a camera, the motor is set so that it becomes parallel with the optical axis in the lens barrel of the camera to set an aperture blades, shutter, lens and the like to the inside-diameter portion of the motor. Thereby, it is possible to decrease the diameter of the lens barrel of the camera.

FIG. 24 is an exploded perspective view showing a component of the stepping motor of the second conventional example. FIG. 25 is an illustration showing a structure of an already-assembled stepping motor.

In FIGS. 24 and 25, the stepping motor is provided with a rotor 401, first coil 402, second coil 404, first stator 418, second stator 419 and connecting ring 420. The rotor 401 is inserted into the inside-diameter portion of the connecting ring 420 and rotatably held by convex portions 420a and 420i of the connecting ring. Moreover, by setting a pin 401t to the rotor 401, an output for moving the aperture blades or lens barrel is fetched through the pin 401t. Reference numerals 418a to 418h denote magnetic-pole teeth.

However, conventional stepping motors described in the above Japanese Patent Application Laid-Open Nos. H09-331666 (U.S. Pat. No. 5,831,356) and 2002-51526 (U.S. Pat. No. 6,798,903 and U.S. Pat. No. 6,800,970) respectively constitute a rotor by attaching a magnet to an output shaft or output pin with an adhesive or the like.

Therefore, there is a problem that the quality of a stepping motor is not stabilized due to the rotor assembling accuracy, overflow of an adhesive or imperfect adhesion. Particularly, when decreasing the diameter of the stepping motor, overflowed adhesive occupies a relatively large volume and interrupts stable rotation of a rotor.

Moreover, to achieve high speed of and improvement of a response speed of a stepping motor, it is necessary to decrease the moment of inertia of a rotor. However, it is difficult to decrease a conventional stepping motor in weight and decrease of the moment of inertia of the rotor is restricted.

SUMMARY OF THE INVENTION

It is an object of the present invention to provide a driving apparatus making increase of rotation and improvement of response speed possible.

To achieve the above object, a driving apparatus of the present invention is provided with a first magnet which is formed like a cylindrical shape and whose outer circumferential surface is alternately magnetized to polarities different in the circumferential direction, second magnet which is formed like a cylindrical shape and whose outer circumferential surface is alternately magnetized to polarities different in the circumferential direction, rotor in which a first magnetic pole portion made of a soft magnetic material opposite to the outer circumferential surface of the first magnet and second magnetic pole portion made of a soft magnetic material opposite to the inner circumferential surface of the second magnet are integrally formed, stator for fixing the first and second magnets to the same shaft and rotatably supporting the rotor, first coil fixed to the stator to magnetically excite the first magnetic pole portion of the rotor and second coil fixed to the stator to magnetically excite the second magnetic pole portion.

Preferably, the magnetic pole portion is formed by cutting off the side of the rotor.

Moreover, a driving apparatus of the present invention is provided with a first magnet which is formed like a cylindrical shape and whose outer circumferential surface is alternately magnetized to polarities in the circumferential direction, second magnet which is formed like a cylindrical shape and whose inner circumferential surface is alternately magnetized to different polarities in the circumferential direction, rotor in which a first magnetic pole portion made of a soft magnetic material opposite to the outer circumferential surface of the first magnet and a second magnetic pole portion made of a soft magnetic material opposite to the inner circumferential surface of the second magnet are integrally formed, stator for fixing the first and second magnets to the same axis and rotatably supporting the rotor, first coil fixed to the stator to magnetically excite the first magnetic pole portion of the rotor and second coil for magnetically exciting the second magnetic pole portion of the rotor.

Preferably, the first magnetic pole portion is set so that it protrudes from the inner circumferential surface of the rotor, the second magnetic pole portion is set so that it protrudes from the outer circumferential surface of the rotor and the first and second magnetic pole portions are arranged with a predetermined phase difference in the circumferential direction of the rotor.

According to the present invention, because the rotor of a driving apparatus is constituted only of a rotor, a trouble generated due to imperfect adhesion of a component of the rotor is settled and it is possible to provide a driving apparatus having stable quality. Moreover, because the magnetic pole portion is integrated with the rotor, it is possible to decrease the rotor in weight when the diameter of the rotor is the same as the case of using a magnet as the rotor as ever. Therefore, it is possible to decrease the moment of inertia of the rotor. Thereby, it is possible to provide a driving apparatus achieving high speed of rotation and improvement of response speed.

The above and other objects, features, and advantages of the invention will become more apparent from the following detailed description taken in conjunction with the accompany with drawings.

BRIEF DESCRIPTION OF THE DRAWINGS

FIG. 8 is an exploded perspective view showing components f a stepping motor serving as a driving apparatus of a second embodiment of the present invention;

DESCRIPTION OF THE PREFERRED EMBODIMENTS

Embodiments of the present invention will be described below by referring to the accompanying drawings.

First Embodiment

Figure 1:
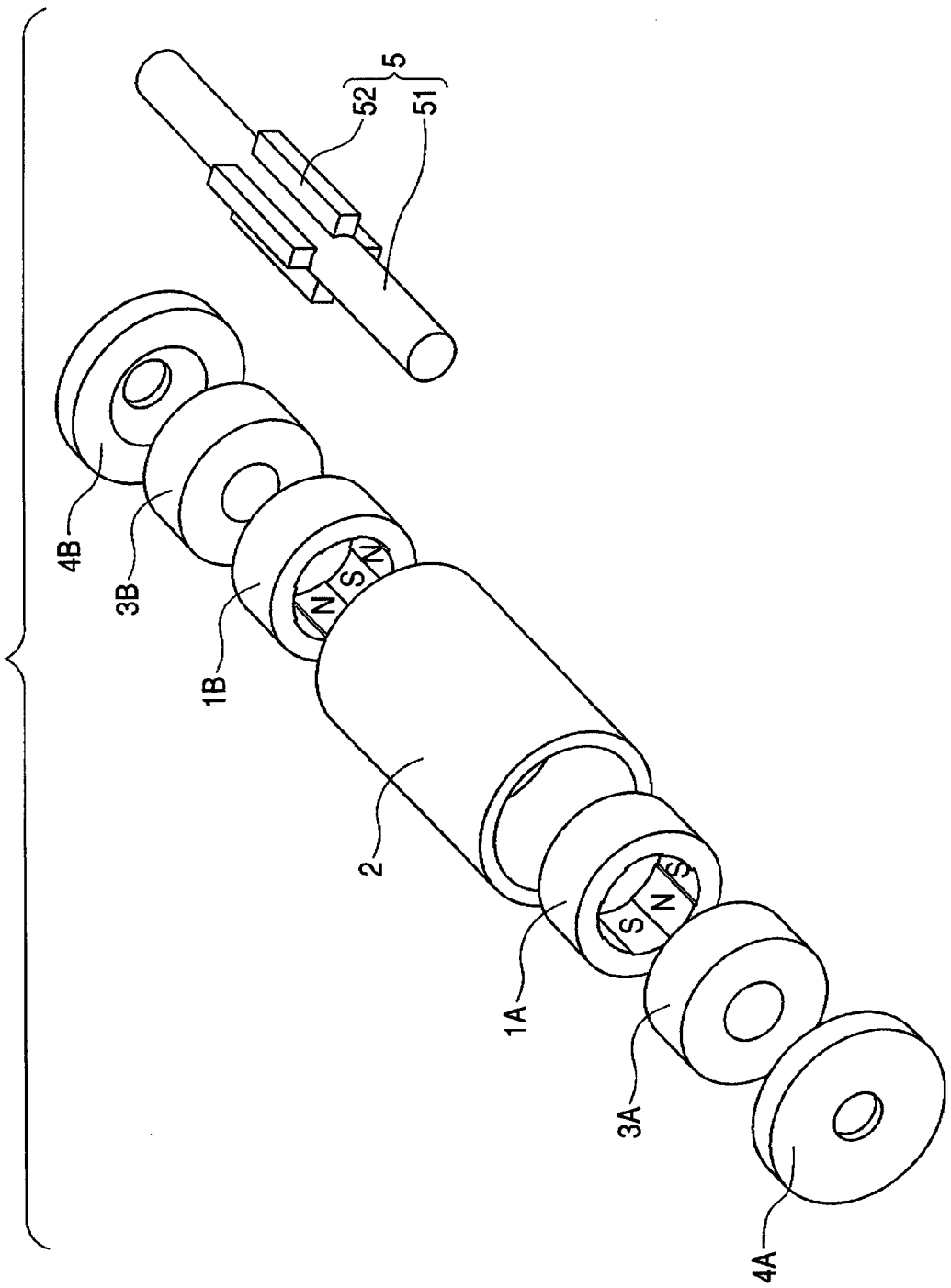
FIG. 1 is an exploded perspective view showing components of a stepping motor serving as a first embodiment of the present invention.
Figure 2:
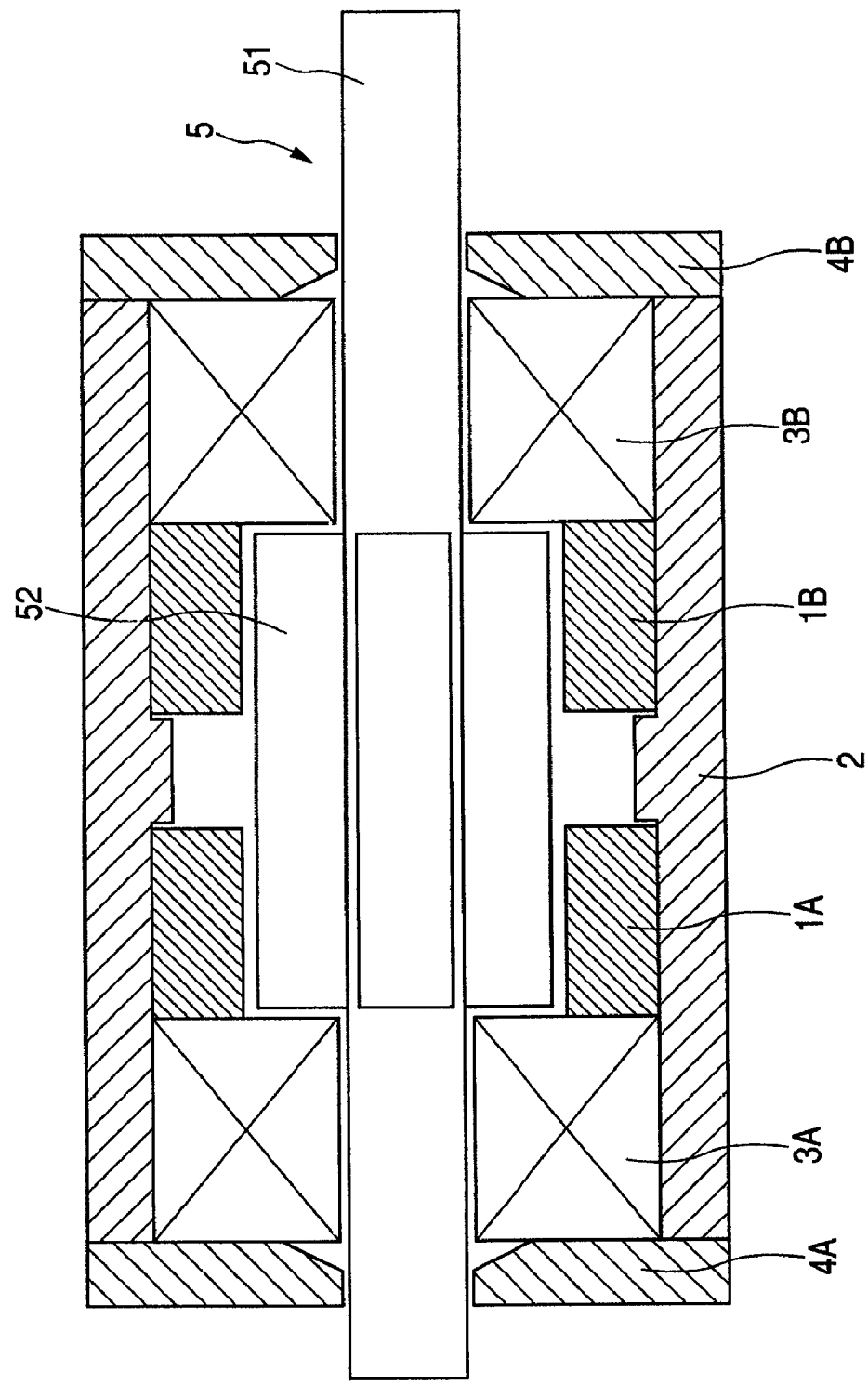
FIG. 2 is a sectional view showing a structure along the axis direction of an already-assembled stepping motor.

FIG. 1 is an exploded perspective view showing components of a stepping motor serving as a driving apparatus of a first embodiment of the present invention. FIG. 2 is a sectional view showing a structure of an already-assembled stepping motor along the axis direction.

In FIGS. 1 and 2, the stepping motor is provided with a first magnet 1A, second magnet 1B, stator 2, first coil 3A, second coil 3B, first bearing 4A, second bearing 4B and rotor 5.

The first magnet 1A is formed like a hollow cylinder and constituted as a magnetized portion in which the inner circumferential surface of the magnet 1A is divided into N portions (eight portions in the case of this embodiment) and the S pole and the N pole are alternately magnetized. The outer circumferential surface of the first magnet 1A is constituted so as to have a weaker magnetizing distribution compared to the case of an inner circumferential surface or it is not magnetized at all or to be magnetized to a polarity opposite to that of the inner circumferential surface. The first magnet 1A is set to the outer circumferential side of the rotor 5.

The second magnet 1B has the same shape as the first magnet 1A and is formed like a hollow cylindrical shape, its inner circumferential surface is divided into N portions (N=8 for this embodiment) in the circumferential direction and is formed as a magnetized portion in which the S pole and the N pole are alternately magnetized. The outer circumferential surface of the second magnet 1B has a weaker magnetizing distribution compared to the inner circumferential surface, it is not magnetized at all or it is magnetized to a polarity opposite to that of the inner circumferential surface. The second magnet 1B is set to the outer circumferential surface of the rotor 5 on the same axis as that of the first magnet 1A at the inner circumferential side of the stator 2.

The stator 2 is formed of a soft magnetic material into a cylindrical shape. The inside diameter of the stator 2 is set so as to be almost equal to the outside diameter of the first magnet 1A (second magnet 1B).

The first coil 3A has multiple cylindrically wound wires coaxially with the first magnet 1A. The outside diameter of the first coil 3A is set to a dimension almost equal to the outside diameter of the first magnet 1A.

The second coil 3B has the same shape as the first coil 3A and many conducting wires of it are cylindrically wound on the same axis as that of the second magnet 1B. The outside diameter of the second coil 3B is set to a dimension almost equal to the outside diameter of the second magnet 1B. The second coil 3B is set on the same axis as that of the first coil 3A on the inner circumferential side of the stator 2.

The first bearing 4A is formed of a soft magnetic material, which rotatably supports the shaft portion 51 of the rotor 5 to be described later and it can be used as a magnetic path.

The second bearing 4B has the same shape as the first bearing 4A, is formed of a soft magnetic material to rotatably support the shaft portion 51 of the rotor 5 to be described later and can be used as a magnetic path.

As shown in FIG. 2, the stator of the stepping motor of this embodiment is constituted by fixing the first magnet 1A, first coil 3A, first bearing 4A, second magnet 1B, second coil 3B and first bearing 4B to the inner circumferential portion of the stator 2.

The rotor 5 is formed of a soft magnetic material and constituted of a shaft portion 51 and magnetic pole portions 52-1, 52-2, . . . , 52-N/2 (properly referred to as magnetic pole portion 52 in the following description). The outside diameter of the magnetic pole portion 52 is set so as to be slightly smaller than the inside diameter of the first magnet 1A (second magnet 1B) (refer to FIG. 2). The number of magnetic pole portions 52 is set to 1 or N/2 (N denotes the number of the poles of a magnet). In the case of this embodiment, the number of magnetic pole portions is set to 4. The magnetic pole portions 52 are respectively formed like a convex pole (almost rectangular parallelepiped) by working a soft magnetic material and are set at four places at equal intervals along the axis direction of the shaft portion 51.

As shown in FIG. 2, the rotor of the stepping motor of this embodiment is constituted by rotatably supporting the rotor 5 by the first bearing 4A and second bearing 4B. In this case, the magnetic pole portions 52-1, 52-2, . . . , 52-N/2 faces magnetized portions of the first magnet 1A and second magnet 1B.

Then, the driving principle for rotating the rotor 5 with respect to the stator 2 in the stepping motor of this embodiment having the above configuration is described below in detail by referring to FIGS. 3 to 7.

Figure 3:
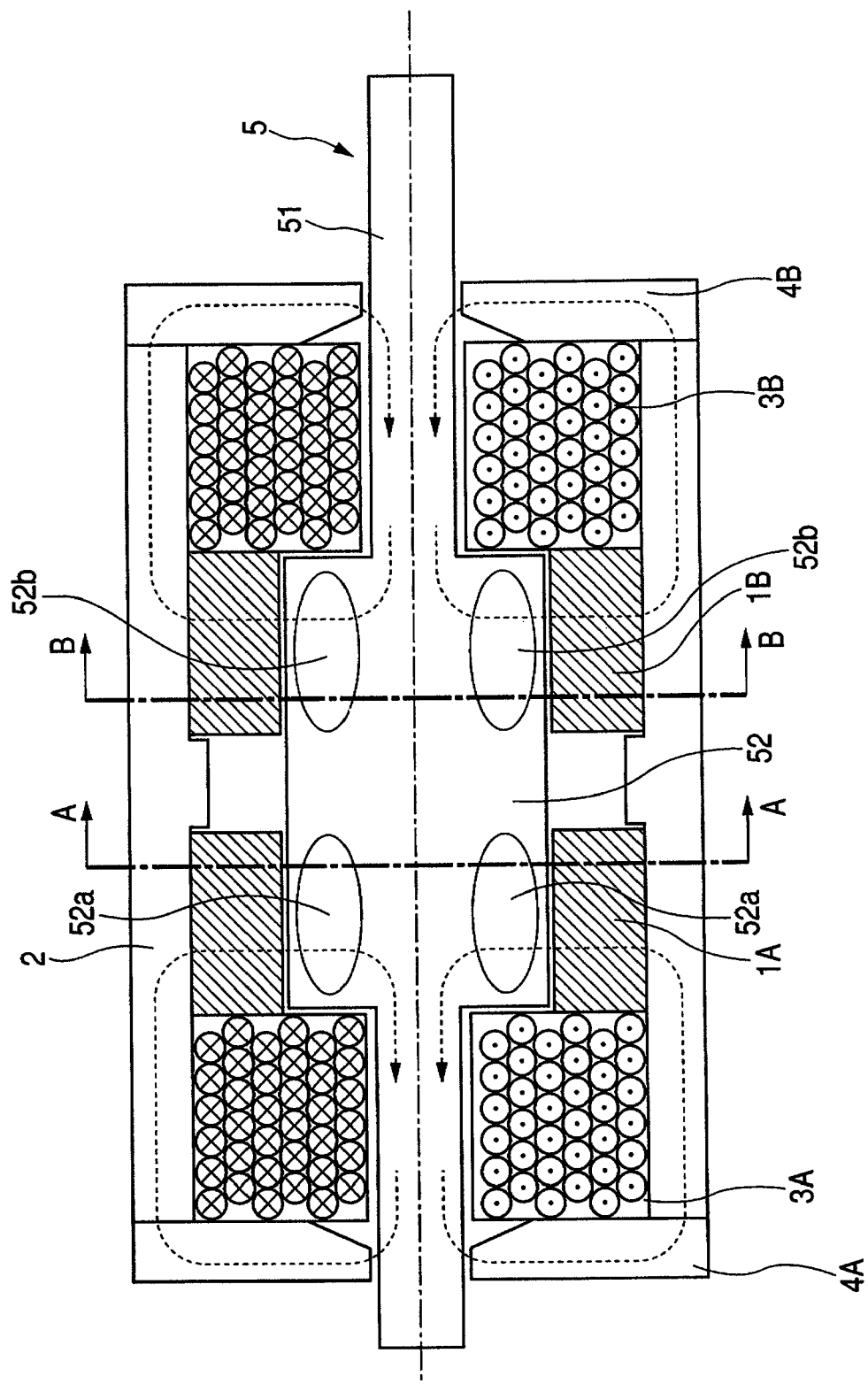
FIG. 3 is a sectional view showing a state of a magnetic path when electrifying the first and second coils of a stepping motor in the forward direction.

FIG. 3 is a sectional view showing the state of a magnetic path when electrifying the first coil 3A and second coil 3B of the stepping motor in the forward direction.

In FIG. 3, a magnetic flux generated by electrifying the first coil 3A forms a loop making a circuit of the first bearing 4A, stator 2, first magnet 1A and magnetic pole portion 52 of rotor 5. A gap in a magnetic path is present only on (1) the portion between the first bearing 4A and the shaft portion 51 and (2) the portion between the magnetic pole portion 52 and the first magnet 1A and the magnetic flux formed by the first coil 3A effectively acts on the first magnet 1A. That is, it is possible to realize an efficient stepping motor. In this case, the portion where the magnetic pole portion 52 of the rotor 5 opposite to the first magnet 1A (magnetic pole surface at a portion shown by reference number 52a in FIG. 3) is excited as N pole. The magnetic pole of this portion 52a can be selected in accordance with a direction for electrifying the first coil 3A.

Similarly, a magnetic flux generated by electrifying the second coil 3B forms a loop passing through the magnetic pole portion 52 of the rotor 5, second magnet 1B, stator 2 and second bearing 4B. The magnetic pole where the magnetic pole portion 52 of the rotor 5 faces the second magnet 1B (magnetic pole surface at a portion shown by reference number 52b in FIG. 3) is magnetized to S pole. The magnetic pole of this portion 52b can be selected in accordance with the direction for electrifying the second coil 3B.

FIGS. 4A to 7B are illustrations showing relations of angle positions between the rotor 5 in each electrified state and the first magnet 1A and second magnet 1B.

FIGS. 4A to 7B show states in which the rotor 5 is rotated by changing directions for electrifying the first coil 3A and second coil 3B. FIGS. 4A, 5A, 6A and 7A respectively show a cross section along the line A-A in FIG. 3, and FIGS. 4A, 5B, 6B and 7B respectively show a cross section along the line B-B in FIG. 3. In this case, the phase difference between the first magnet 1A and the second magnet 1B is shifted by 180/N (N is the number of the poles of a magnet) and set to 22.5° in the case of this embodiment.

Figure 4A:
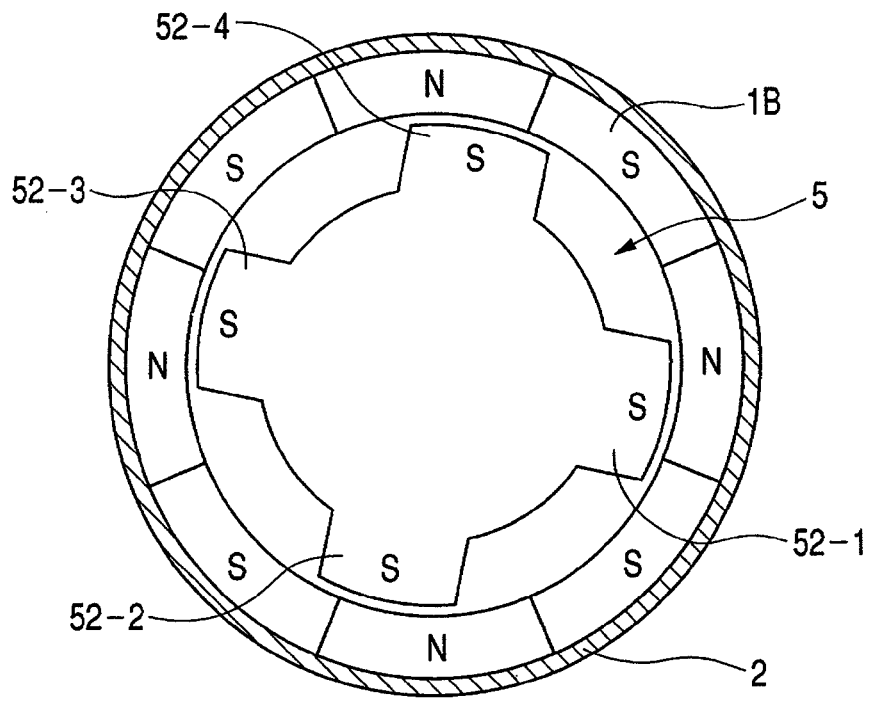
FIGS. 4A and 4B are illustrations showing relations of angle positions between rotors in electrified states and the first and second magnets.
Figure 4B:
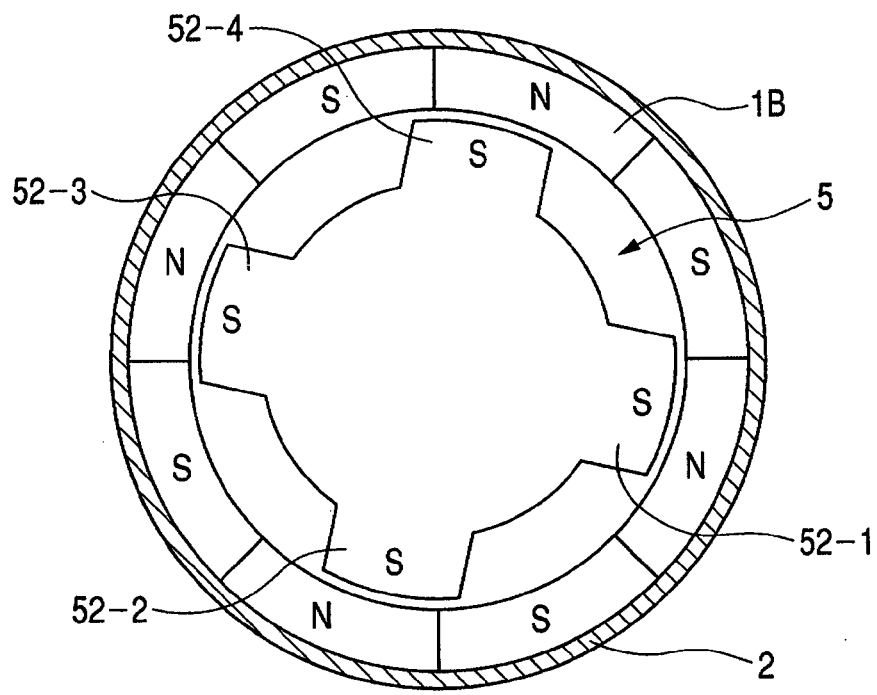

FIGS. 4A and 4B show states of electrifying the first coil 3A in the forward direction and electrifying the second coil 3B in the reverse direction. By electrifying the first coil 3A and second coil 3B, the portion 52a of the magnetic pole portion 52 of the rotor 5 is excited to S pole and the portion 52b is excited to S pole. In this case, the rotor 5 is stabilized at angle positions shown in FIGS. 4A and 4B in accordance with the magnetic balance between the magnetic portion 52 of the magnetically excited rotor 5 on one hand and the first magnet 1A and the second magnet 1B on the other.

Figure 5A:
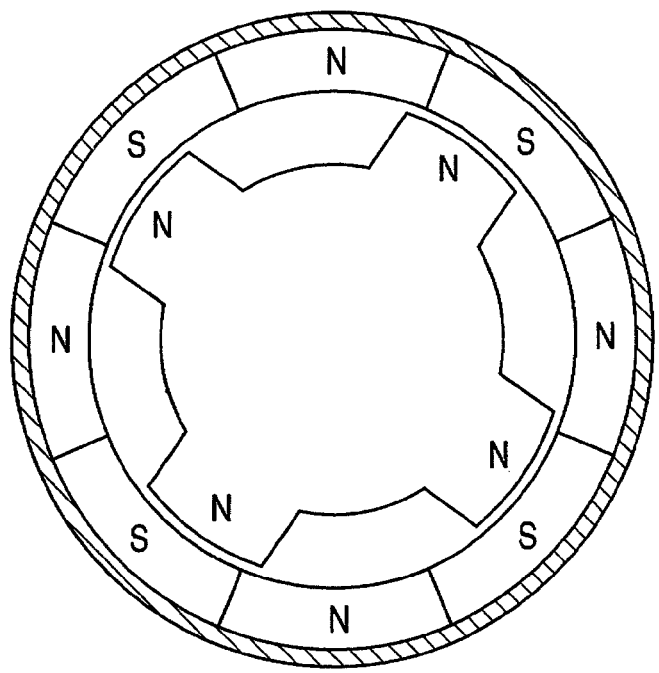
FIGS. 5A and 5B are illustrations showing relations of angle positions between rotors in electrified states and the first and second magnets.
Figure 5B:
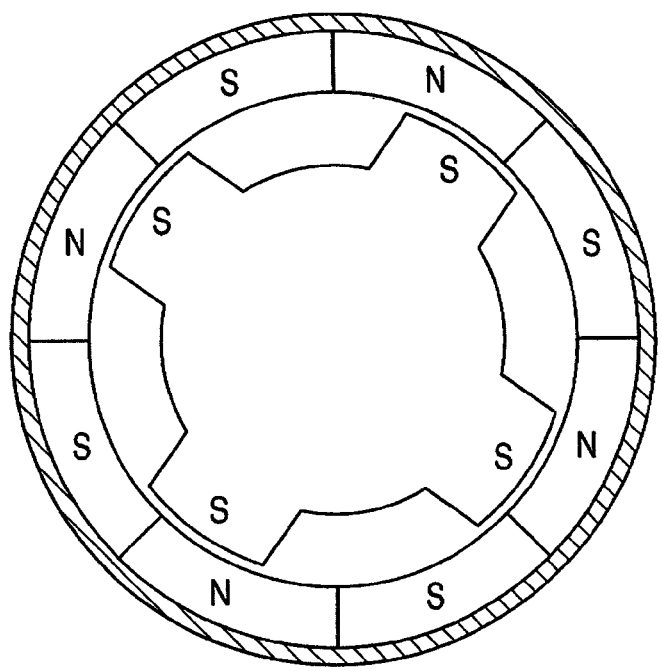

FIGS. 5A and 5B show states of electrifying the first coil 3A in the reverse direction and the second coil 3B in the reverse direction. The portion 52a of the magnetic pole portion 52 of the rotor 5 is excited as N pole and the portion 52b is excited to S pole. The rotor 5 is stabilized at angle positions shown in FIGS. 5A and 5B rotated by 1×180/N° (22.5° in the case of this embodiment) from the states shown in FIGS. 4A and 4B.

Figure 6A:
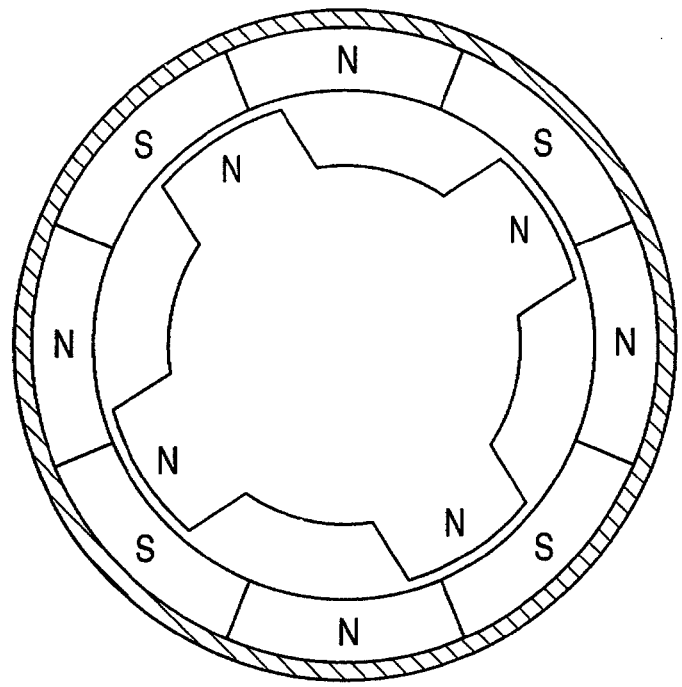
FIGS. 6A and 6B are illustrations showing relations of angle positions between rotors in electrified states and the first and second magnets.
Figure 6B:
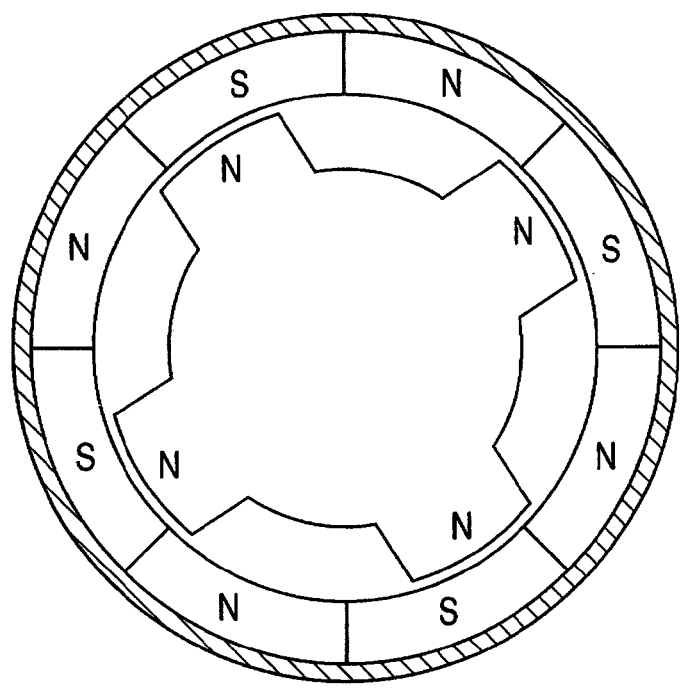

FIGS. 6A and 6B show states of electrifying the first coil 3A in the reverse direction and the second coil 3B in the forward direction. The portion 52a of the magnetic pole portion 52 of the rotor 5 is excited as N pole and the portion 52b is excited as N pole. The rotor 5 is stabilized at angle positions shown in FIGS. 6A and 6B rotated by 2×180/N° from the states shown in FIGS. 4A and 4B.

Figure 7A:
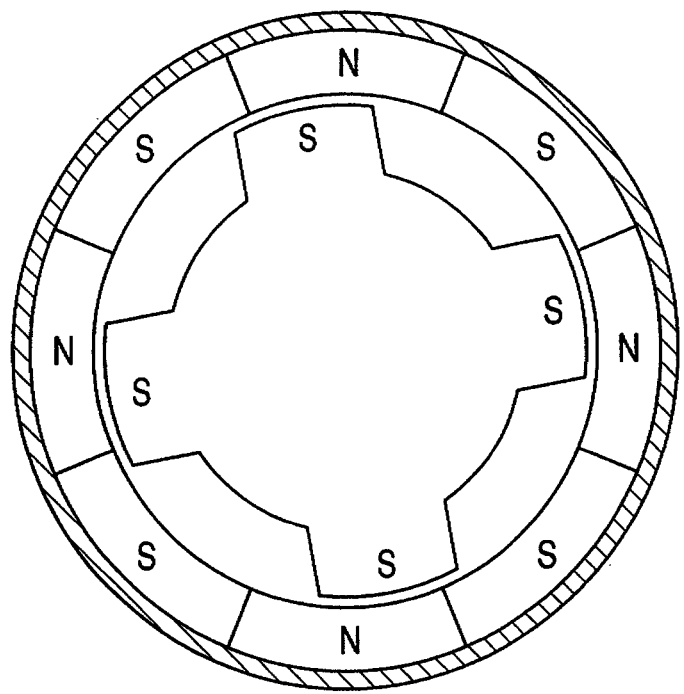
FIGS. 7A and 7B are illustrations showing relations of angle positions between rotors in electrified states and the first and second magnets.
Figure 7B:
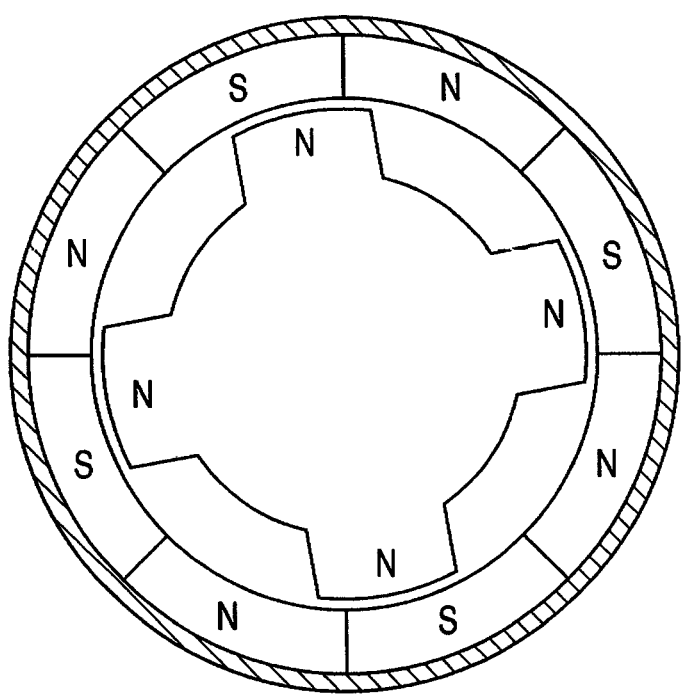

FIGS. 7A and 7B show states of electrifying the first coil 3A in the forward direction and the second coil 3B in the forward direction. The portion 52a of the magnetic pole portion 52 of the rotor 5 is excited to S pole and the portion 52b is excited as N pole. The rotor 5 is stabilized at angle positions shown in FIGS. 7A and 7B rotated by 3×180/N° from the states shown in FIGS. 4A and 4B.

Then, the first coil 3A is again electrified in the forward direction and the second coil 3B is electrified in the reverse direction. The rotor 5 is stabilized at angle positions rotated by 4×180/N° (90° in the case of this embodiment) from the states shown in FIGS. 4A and 4B. The states in this case are the same as the states in FIGS. 4A and 4B.

Thus, by sequentially changing the electrifying directions for the first coil 3A and second coil 3B, it is possible to shift the rotational-directional stabilizing position of the rotor 5 and rotate the rotor 5 with respect to the stator 2.

In the case of this embodiment, the rotor of a stepping motor is constituted only of a rotor. Therefore, it is unnecessary to attach a plurality of components constituting a rotor by an adhesive like the case of a conventional stepping motor. Thereby, it is possible to settle a trouble at the time of assembling due to overflow of an adhesive or imperfect adhesion and provide a stepping motor whose quality is stabilized.

Moreover, in the case of a rotor used for a conventional stepping motor, a magnet is set at the outermost circumferential surface and its shape is completely cylindrical. However, the outermost circumferential surface of the rotor 5 used for the stepping motor of this embodiment is constituted as the magnetic pole portion 52 formed by notching (by forming a notch for) a soft magnetic material by, for example, 50 to 80%.

In this case, the specific gravity of a material used for a magnet to be set to the outermost circumferential surface of a rotor used for a conventional stepping motor is 7.4 g/cm$^3$ for a neodymium sintered magnet, 8.3 g/cm$^3$ for a samarium cobalt magnet and 6.0 g/cm$^3$ for a neodymium bond magnet. Moreover, the specific gravity of pure iron used for the rotor 5 used for the stepping motor of this embodiment and used for the magnetic pole portion 52 set to the outermost circumferential surface of the rotor 5 is 7.0 g/cm$^3$ which is almost the same as 80 to 120% of the specific gravity of a magnet.

The rotor 5 used for the stepping motor of this embodiment has a structure obtained by notching the soft magnetic material and forming the magnetic pole portion 52 as above. Therefore, it is possible to decrease the rotor in weight and decrease the moment of inertia of the rotor when the diameter of rotors is the same compared to the case of setting a magnet to the outermost circumferential surface of the rotor used for a conventional stepping motor. Thereby, it is possible to provide a stepping motor having high-speed rotation and preferable responsibility.

Moreover, because the rotor 5 in which the magnetic pole portion 52 is formed at the outermost circumferential surface has a simple shape, it is possible to manufacture the rotor by a working method more suitable for mass production such as drawing process and there are advantages that the cost is decreased and the quality is stabilized.

As described above, according to this embodiment, it is possible to provide a stepping motor capable of stabilizing the quality by simplifying the constitution of a rotor and achieving high speed of rotation and improvement of response speed by decreasing the moment of inertia of the rotor.

Second Embodiment

Figure 9:
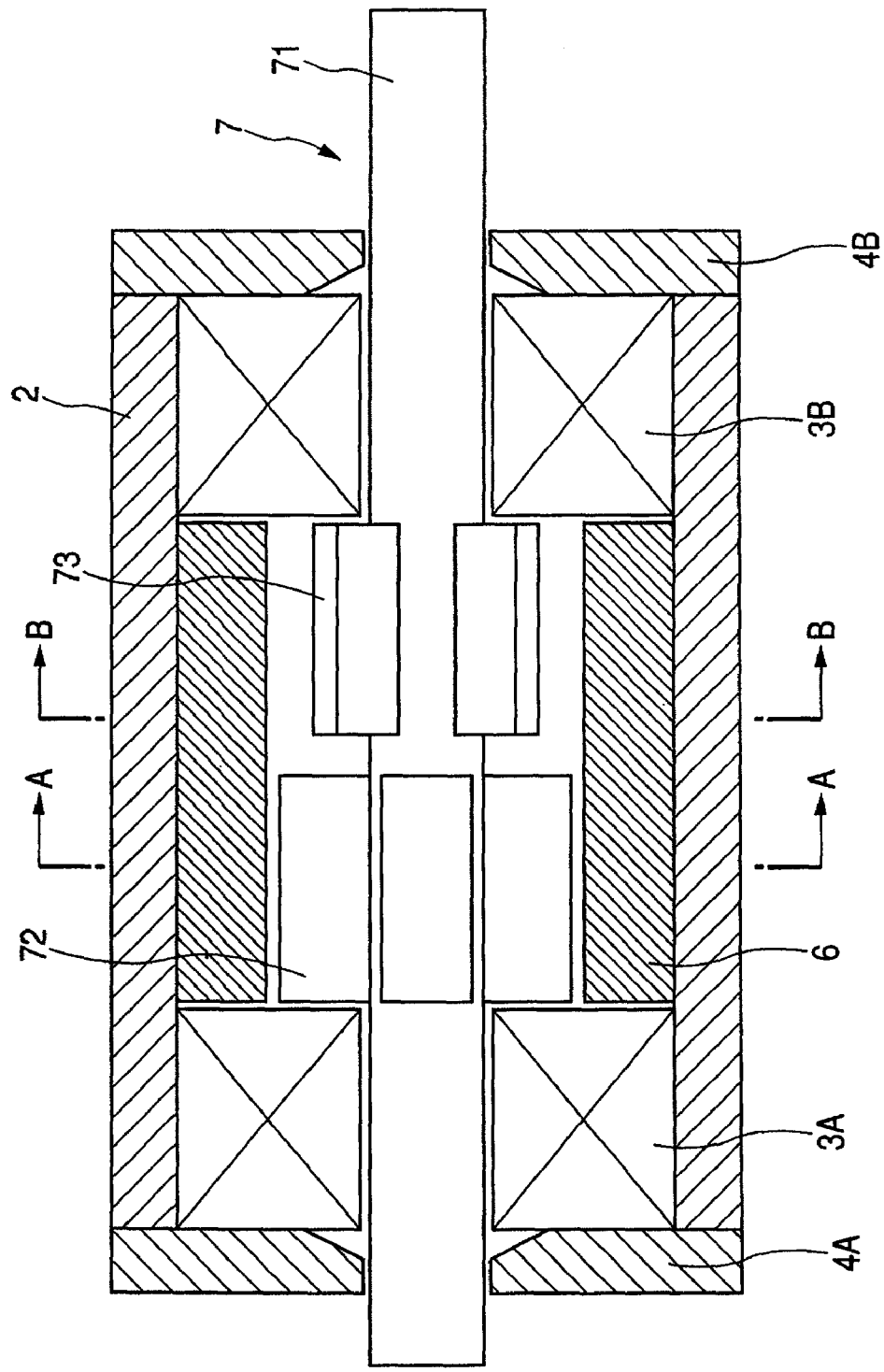
FIG. 9 is a sectional view showing a structure of an already-assembled stepping motor along the axis direction.

FIG. 8 is an exploded perspective view showing components of a stepping motor serving as a driving apparatus of a second embodiment of the present invention. FIG. 9 is a sectional view showing the structure of an already-assembled stepping motor along the axis direction.

In FIGS. 8 and 9, the stepping motor is provided with the stator 2, first coil 3A, second coil 3B, first bearing 4A, second bearing 4B, magnet 6 and rotor 7.

This embodiment is different from the above-described first embodiment in that the set number of magnets is one and that a first magnetic pole portion and second magnetic pole portion are set to a rotor. Other factors of this embodiment are the same as the factors of above-described first embodiment. Therefore, same symbols are attached and their description is omitted.

The magnet 6 is constituted like a hollow cylindrical shape, its inner circumferential surface is divided into N portions (N=8 for this embodiment) in the circumferential direction and it is constituted as a magnetic pole portion in which S pole and N pole are alternately magnetized. The outer circumferential surface of the magnet 6 is constituted so as to have a weaker magnetizing distribution compared to the inner circumferential surface, not to be magnetized at all or to be magnetized as a polarity opposite to that of the inner circumferential surface.

The rotor 7 is formed of a soft magnetic material and is constituted of a shaft portion 71, first magnetic pole portions 72-1, 72-2, ... 72-N/2 (properly referred to as first magnetic pole portion 72 in the following description), second magnetic pole portions 73-1, 73-2, ... 73-N/2 (properly referred to as second magnetic pole portion 73).

The outside diameter of the first magnetic pole portion 72 is set to a dimension slightly smaller than the inside diameter of the magnet 6 (refer to FIG. 9). The number of first magnetic pole portions 72 is set to 1 or N/2 (N is the number of poles of a magnet). However, in the case of this embodiment, the number of first magnetic pole portions 72 is set to 4. The first magnetic pole portions 72 are respectively formed like a convex pole (rectangular parallelepiped) and set at four places at equal intervals in the outer circumferential direction of the shaft portion 71 along the axis direction of the shaft portion 71.

The second magnetic pole portion 73 is set to a position next to the first magnetic pole portion 72 in the axis direction with respect to the shaft portion 71 and the shape of each second magnetic pole portion 73 and the number of second magnetic pole portions 73 are the same as the case of the first magnetic pole portion 72. However, the second magnetic pole portion 73 is set by having a phase difference of 180/N (22.5° for this embodiment: N denotes that the number of poles of magnet is 8) in the outer circumferential direction of the shaft portion 71 with respect to the first magnetic pole portion 72.

As shown in FIG. 9, the stator of the stepping motor of this embodiment is constituted by fixing the first bearing 4A, first coil 3A, magnet 6, second coil 3B and first bearing 4B to the inner circumferential portion of the stator 2. Moreover, by rotatably supporting the rotor 7 by the first bearing 4A and second bearing 4B, the stator of the stepping motor of this embodiment is constituted. In this case, the first magnetic pole portion 72 and second magnetic pole portion 73 face the magnetized surface of the magnet 6.

Then, a driving principle for rotating the rotor 7 of the stepping motor of this embodiment constituting the above configuration with respect to the stator 2 is described below in detail by referring to FIG. 10A to FIG. 13B.

Also in the case of this embodiment, by forming a magnetic path similar to the case of the above-described first embodiment and electrifying the first coil 3A and thereby exciting the first magnetic pole portion 72 and electrifying the second coil 3B, it is possible to excite the second magnetic pole portion 73.

FIGS. 10 to 13B are illustrations showing the relation of angle position between the rotor 7 in each magnetized state and the magnet 6.

FIGS. 10A to 13B show that the rotor 7 rotates by changing the electrifying directions for the first coil 3A and second coil 3B. FIGS. 10A, 11A, 12A and 13A respectively show the cross section along the line A-A in FIG. 9 and FIGS. 10B, 11B, 12B and 13B respectively show the cross section along the line B-B in FIG. 9.

Figure 10A:
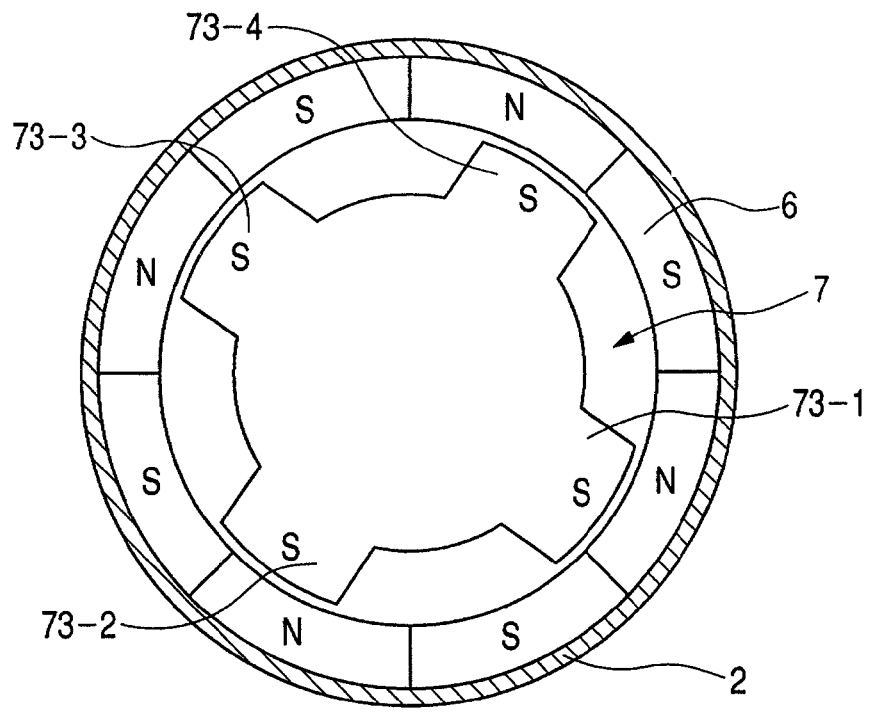
FIGS. 10A and 10B are illustrations showing relations of angle positions between rotors in electrified states and magnets.
Figure 10B:
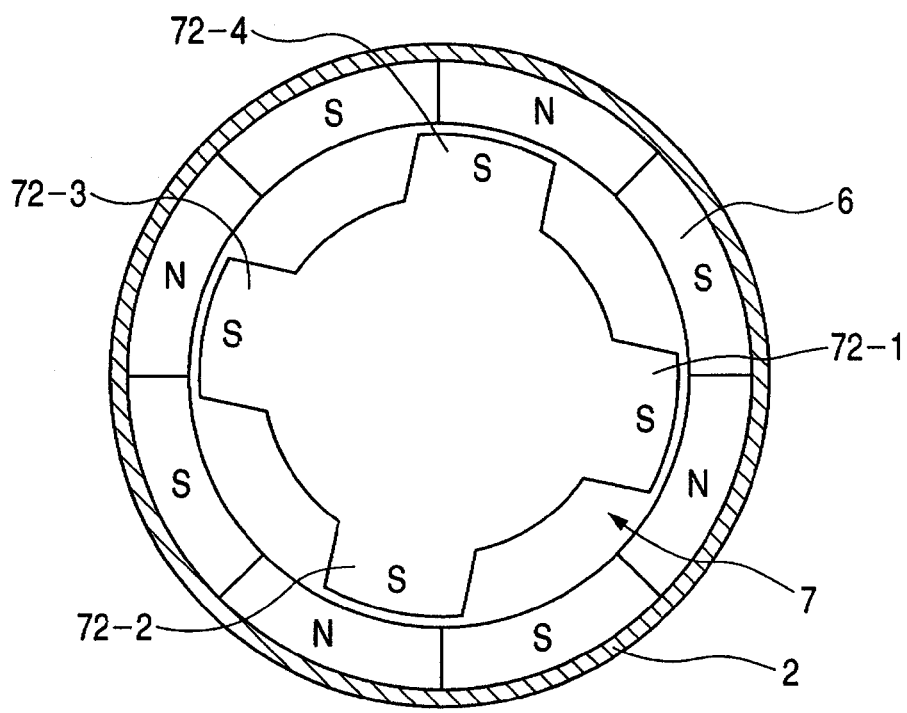

FIGS. 10A and 10B respectively show states of electrifying the first coil 3A in the forward direction and the second coil 3B in the reverse direction. The rotor 7 is stabilized at angle positions shown in FIGS. 10A and 10B in accordance with the magnetic balance between the first magnetic pole portion 72 and the second magnetic pole portion 73 of the magnetically-excited rotor 7.

Figure 11A:
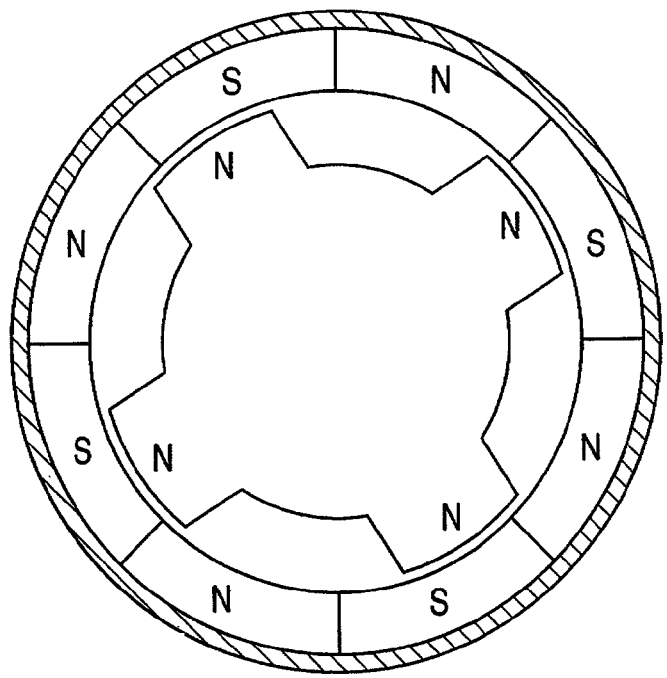
FIGS. 11A and 11B are illustrations showing relations of angle positions between rotors in electrified states and magnets.
Figure 11B:
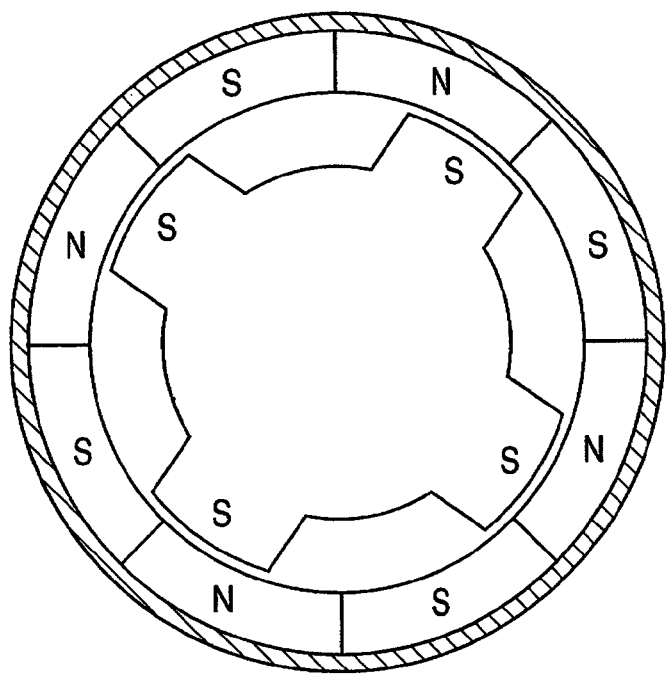

FIGS. 11A and 11B respectively show a state of electrifying the first coil 3A in the reverse direction and the second coil 3B in the reverse direction. The rotor 7 is stabilized at angle positions shown in FIGS. 11A and 11B rotated by 1×80/N° (22.5° for this embodiment) from the states shown in FIGS. 10A and 10B.

Figure 12A:
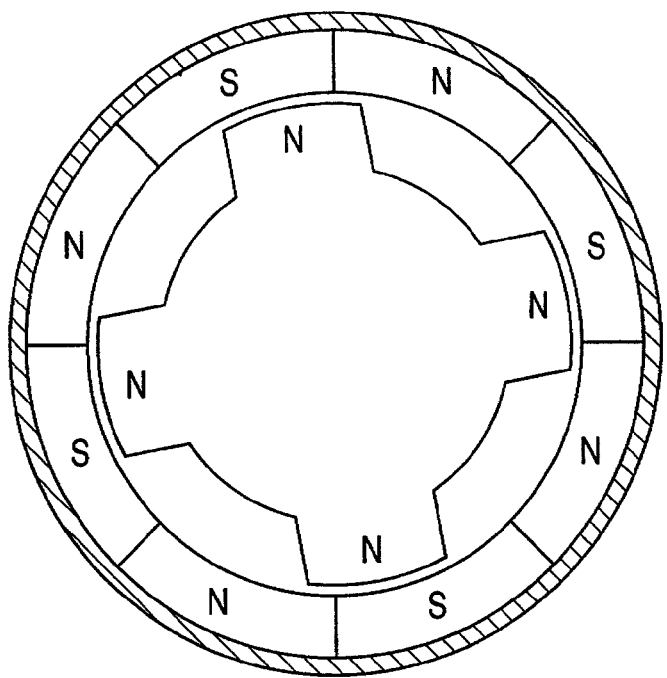
FIGS. 12A and 12B are illustrations showing relations of angle positions between rotors in electrified states and magnets.
Figure 12B:
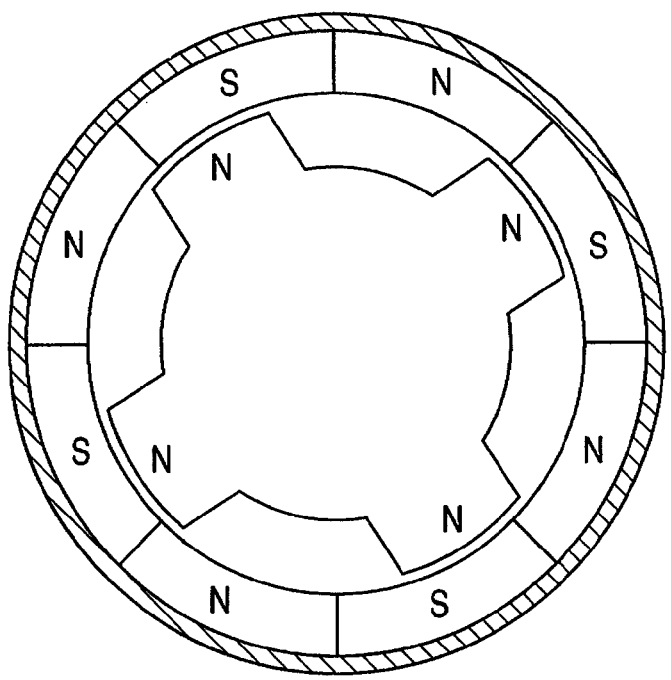

FIGS. 12A and 12B respectively show a state of electrifying the first coil 3A in the reverse direction and the second coil 3B in the forward direction. The rotor 7 is stabilized at angle positions shown in FIGS. 12A and 12B rotated by 2×180/N° (45° for this embodiment) from the states shown in FIGS. 10A and 10B.

Figure 13A:
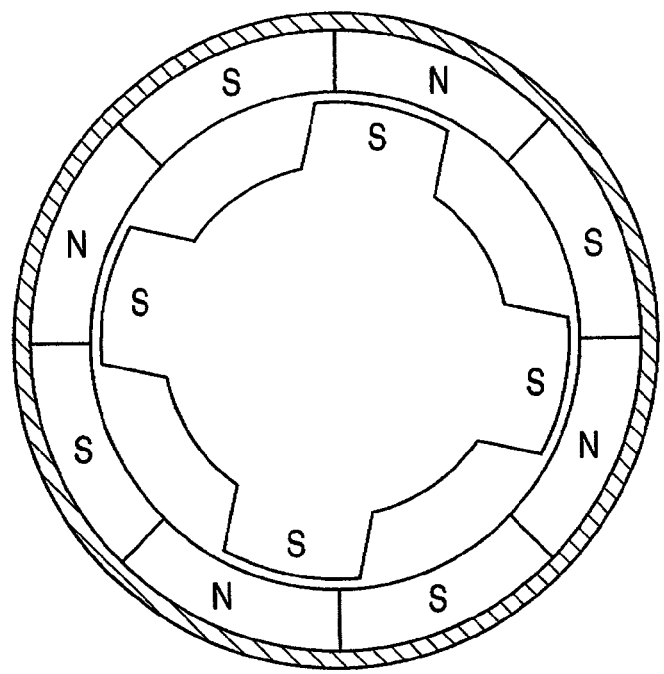
FIGS. 13A and 13B are illustrations showing relations of angle positions between rotors in electrified states and magnets.
Figure 13B:
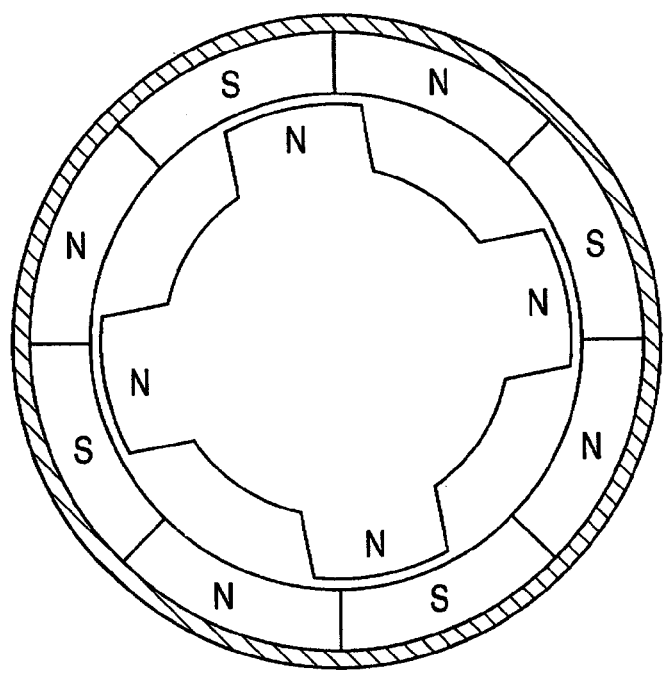

FIGS. 13A and 13B respectively show a state of electrifying the first coil 3A in the forward direction and the second coil 3B in the forward direction. The rotor 7 is stabilized at angle positions shown in FIGS. 13A and 13B rotated by 3×180/N° (67.5° for this embodiment) from the states shown in FIGS. 10A and 10B.

Thus, by sequentially changing electrifying directions for the first coil 3A and second coil 3B, it is possible to shift the stabilized position of the rotor 7 in the rotational direction and rotate the rotor 7 with respect to the stator 2.

In the case of this embodiment, it is possible to decide the phase difference between the first magnetic pole portion 72 and the second magnetic pole portion 73 only by a rotor. Therefore, an advantage is obtained that it is possible to realize a stepping motor whose quality is stabilized without influencing the assembling accuracy.

As described above, according to this embodiment, it is possible to stabilize the quality by simplifying the configuration of a rotor and provide a stepping motor achieving high speed of rotation and improvement of response speed by decreasing the moment of inertia of the rotor.

Third Embodiment

Figure 14:
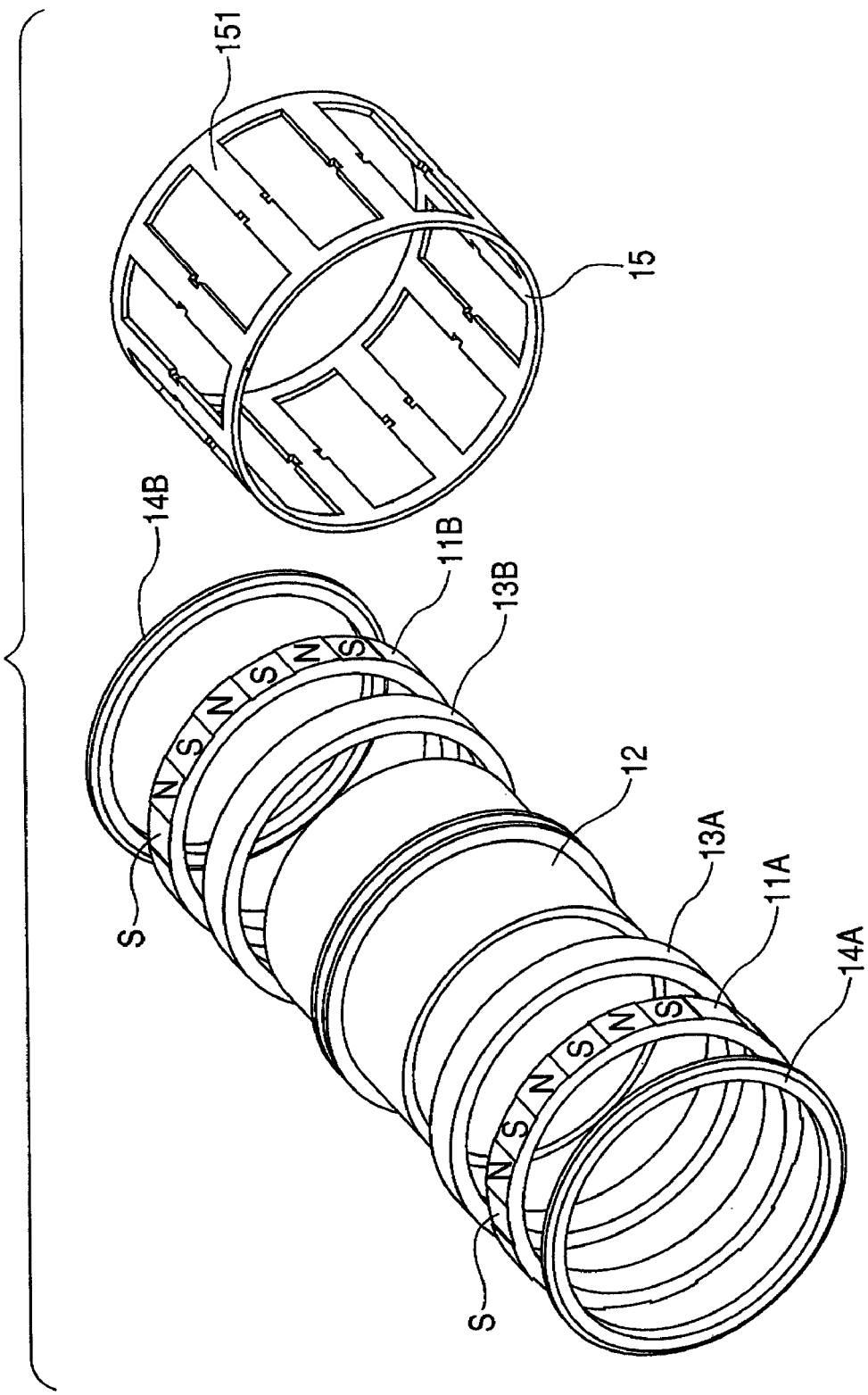
FIG. 14 is an exploded perspective view showing components of a stepping motor serving as a driving apparatus of a third embodiment of the present invention.
Figure 15:
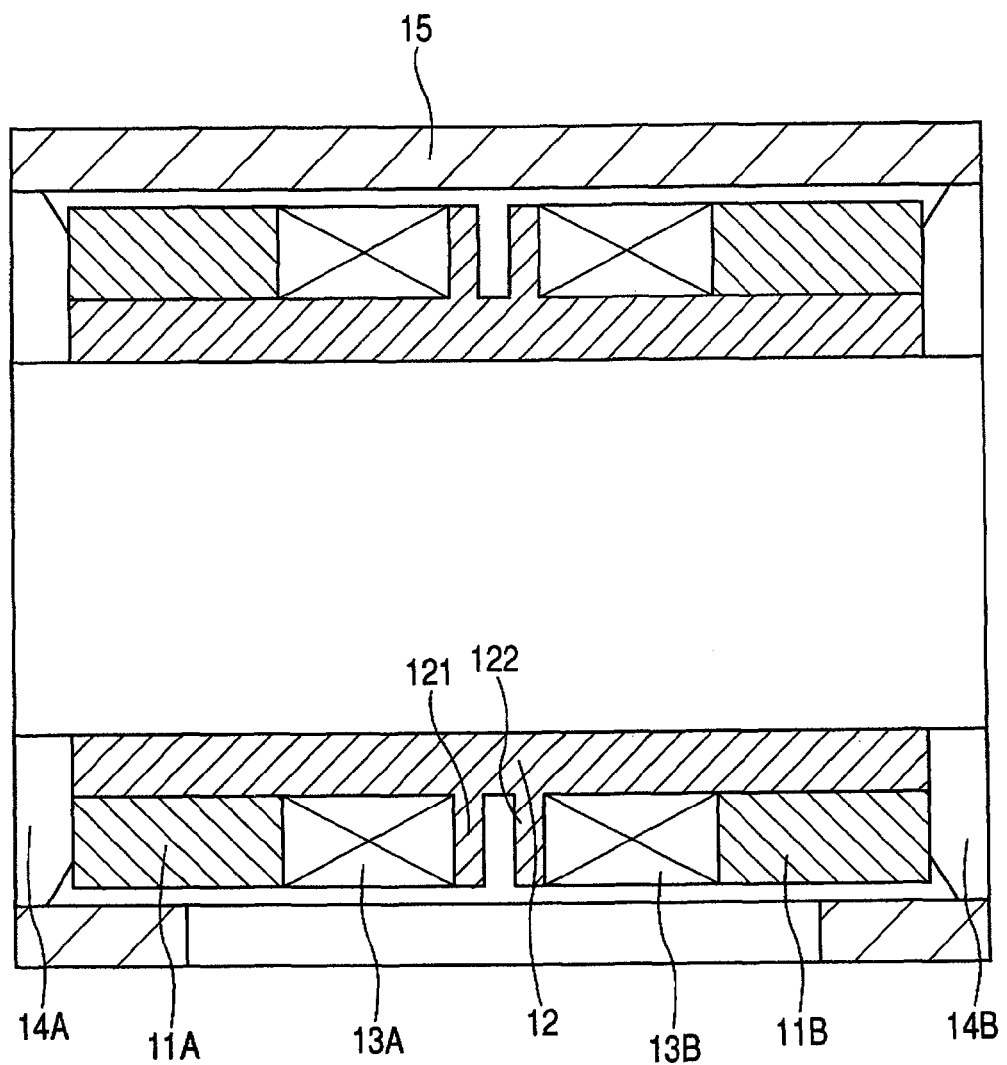
FIG. 15 is a sectional view showing a structure of an already-assembled stepping motor along the axis direction.

FIG. 14 is an exploded perspective view showing components of a stepping motor serving as a driving apparatus of a third embodiment of the present invention. FIG. 15 is a sectional view showing the structure of an already-assembled stepping motor along the axis direction.

In FIGS. 14 and 15, a stepping motor is provided with a first magnet 11A, second magnet 11B, stator 12, first coil 13A, second coil 13B, first bearing 14A, second bearing 14B and rotor 15.

The first magnet 11A is formed like a hollow cylindrical shape, its outer circumferential surface is divided into N portions (N=20 for this embodiment) in the circumferential direction and constituted as a magnetized portion in which S pole and N pole are alternately magnetized. The first magnet 11A is set to the inner circumferential side of the rotor 15.

The second magnet 11B has the same shape as the first magnet 11A and is formed like a hollow cylindrical shape, its outer circumferential surface is divided into N portions (N=20 for this embodiment) in the circumferential direction and constituted as a magnetic pole portion in which S pole and N pole are alternately magnetized. The second magnet 11B is set to the inner circumferential side of the rotor 15.

The stator 12 is formed of a soft magnetic material into a generally cylindrical shape. The outside diameter of the stator 12 is set to a dimension almost equal to the inside diameter of the first magnet 11A (second magnet 11B). Discoid first and second magnetic-flux transfer portions 121 and 122 extending in the diameter direction are formed near the axis-directional center of the stator 12.

The first coil 13A is a coil in which many conducting wires are cylindrically wound on the same axis as that of the first magnet 11A. The outside diameter of the first coil 13A is set to a dimension almost equal to the outside diameter of the first magnet 11A.

The second coil 13B has the same shape as the first coil 13A and is a coil in which many conducting wires are cylindrically wound on the same axis as that of the second magnet 11B. The second coil 13B is set to the same axis as that of the first coil 13A on the inner circumferential side of the rotor 15. The outside diameter of the second coil 13B is set to a dimension almost equal to the outside diameter of the second magnet 11B.

The first bearing 14A is formed of a nonmagnetic material and a magnetic flux does not pass through the bearing 14A. The first bearing 14A supports the rotor 15 rotatably with respect to the stator 12.

The second bearing 14B has the same shape as the first bearing 14A and is formed of a nonmagnetic material, and a magnetic flux does not pass through the bearing 14B. The second bearing 14B supports the rotor 15 rotatably with respect to the stator 12.

As shown in FIG. 15, by fixing the first coil 13A, first magnet 11A, first bearing 14A, second coil 13B, second magnet 11B and second bearing 14B to the outer circumferential portion of the stator 12, the stator of the stepping motor of this embodiment is constituted.

The rotor 15 is formed of a soft magnetic material into a generally cylindrical shape. The side of the rotor 15 is constituted as a magnetic pole portion 151 by being notched like a rectangular shape. The number of magnetic pole portions 151 is set to 1 or N/2 (N denotes the number of poles of a magnet). However, in the case of this embodiment, the number of the magnetic pole portions are set to 10. Moreover, each magnetic pole portion 151 has a notch for cutting off a magnetic flux at both sides near the axis-directional center as is shown in FIG. 14.

As shown in FIG. 15, the rotor 15 is rotatably supported by the first bearing 14A and second bearing 14B with respect to the stator 12 to constitute the rotor of the stepping motor of this embodiment.

In the case of this embodiment, a magnetic flux generated by the first coil 13A forms a magnetic path making a circuit of the stator 12, first magnetic transfer portion 121, magnetic pole portion 151 and first magnet 11A. Moreover, a magnetic flux generated by the second coil 13B forms a magnetic path making a circuit of the stator 12, second magnetic transfer portion 122, magnetic pole portion 151 and second magnet 11B.

Thereby, it is possible to magnetically excite a portion in the magnetic pole portion 151 opposite to the first magnet 11A by the first coil 13A and a portion in the magnetic pole portion 151 opposite to the second magnet 11B by the second coil 13B in the magnetic pole portion 151. Therefore, it is possible to rotate the rotor 15 from the stator 12.

Thus, the stepping motor of this embodiment realizes a structure capable of setting the rotor 15 to the outermost circumferential surface of the stepping motor by magnetizing the outer circumference of the first magnet 11A and the second magnet 11B.

In the case of this embodiment, it is possible to realize an annular stepping motor having an opening at both the axis-directional ends. Thereby, it is possible to use an opening for the optical path of a lens, channel of fluid, or electric wiring. In this case, a structure is realized in which the rotor 15 is located at the outermost diameter portion of the stepping motor. Therefore, it is not necessary to set an output pin or the like when fetching an output of the stepping motor and it is possible to provide a stepping motor from which an output can be easily fetched.

Moreover, because the rotor 15 is constituted as the magnetic pole portion 151 by notching the side of the rotor 15, it is possible to decrease the moment of inertia compared to the case of using a completely-cylindrical magnet for a rotor as ever. Thereby, it is possible to provide a stepping motor achieving high speed of rotation and improving the response speed.

As described above, according to this embodiment, it is possible to provide a stepping motor for stabilizing the quality by simplifying the configuration of a rotor and achieving high speed of rotation and improvement of response speed by decreasing the moment of inertia of the rotor.

Fourth Embodiment

Figure 16:
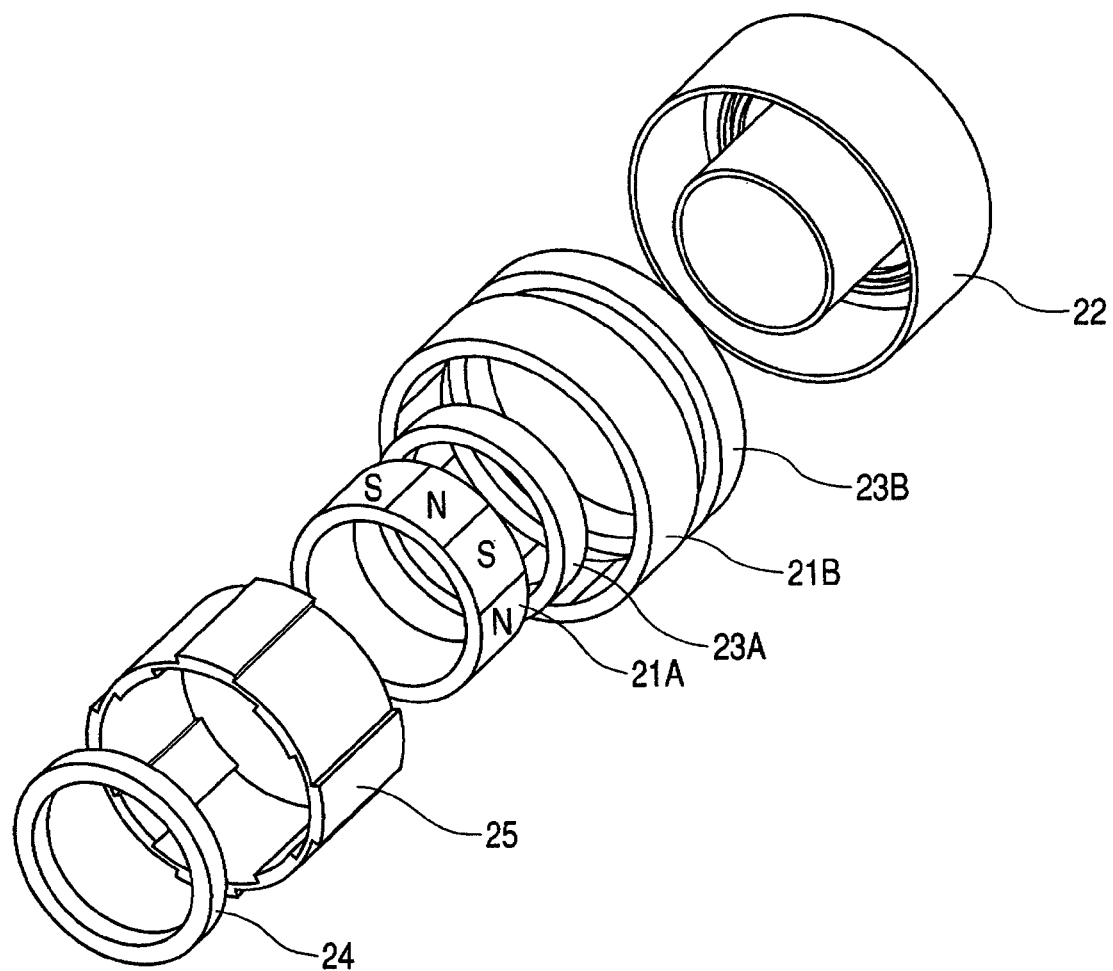
FIG. 16 is an exploded perspective view of components of a stepping motor of a fourth embodiment of the present invention.
Figure 17:
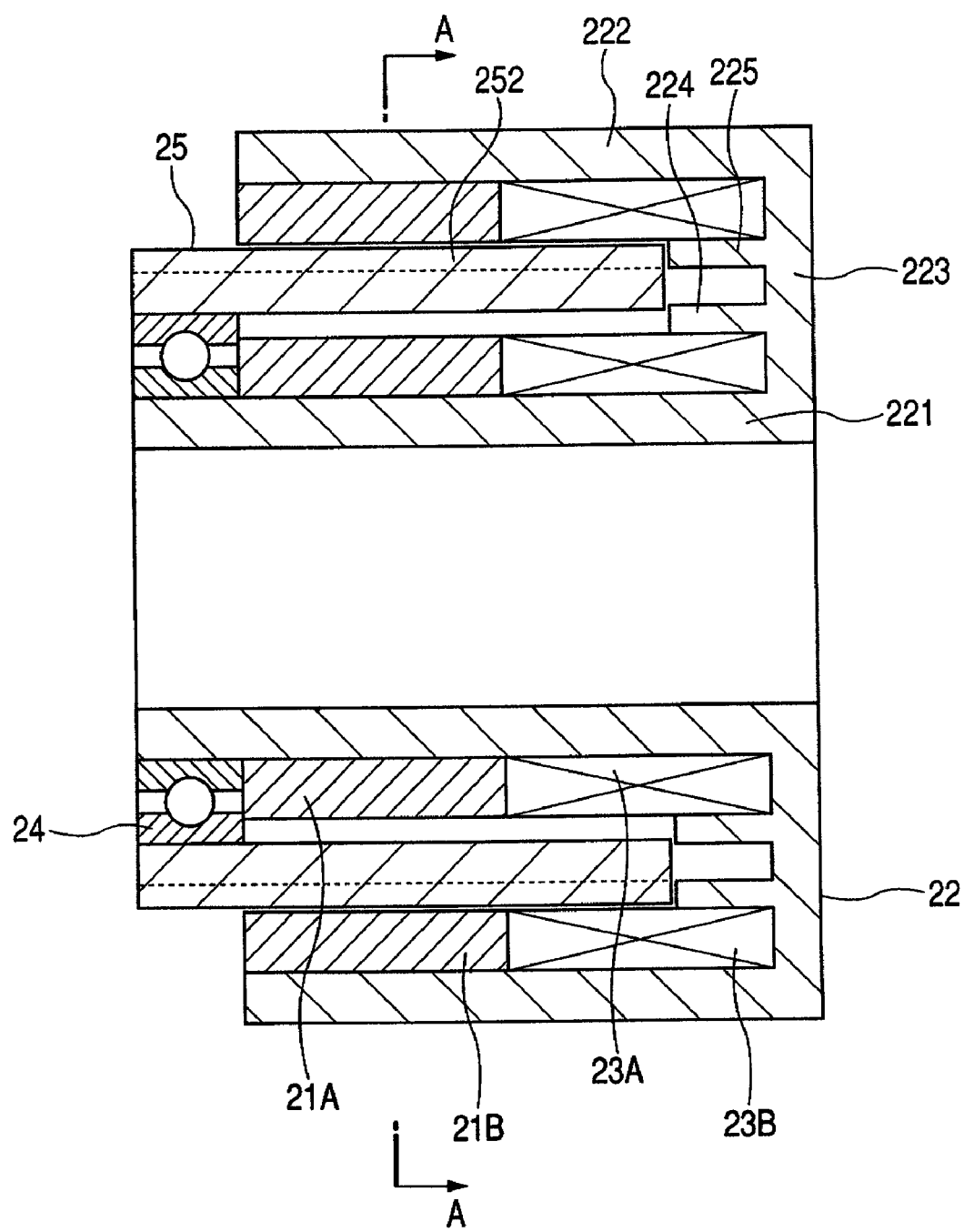
FIG. 17 is a sectional view showing a structure of an already-assembled stepping motor along the axis direction.

FIG. 16 is an exploded perspective view showing components of a stepping motor of a fourth embodiment of the present invention. FIG. 17 is a sectional view showing the structure of an already-assembled stepping motor along the axis direction.

In FIGS. 16 and 17, the stepping motor is provided with a first magnet 21A, second magnet 21B, stator 22, first coil 23A, second coil 23B, bearing 24 and rotor 25.

The first magnet 21A is formed like a hollow cylindrical shape, its outer circumferential surface is divided into N portions (N=8 for this embodiment) in the circumferential direction and it is constituted as a magnetized portion in which S pole and N pole are alternately magnetized. The first magnet 21A is set to the inner circumferential side of the rotor 25.

The second magnet 21B is formed like a hollow cylindrical shape, its inner circumferential surface is divided into N portions (N=8 for this embodiment) in the circumferential direction and is constituted as a magnetized portion in which S pole and N pole are alternately magnetized. The inside diameter of the second magnet 21B is set to a dimension larger than the outside diameter of the first magnet 21A. The second magnet 21B is set to the outer circumferential side of the rotor 25.

The stator 22 is formed of a soft magnetic material into a double cylindrical shape having a U-shaped cross section (refer to FIG. 17) and constituted of an inner cylinder 221, outer cylinder 222 and connecting portion 223. The connecting portion 223 is provided with a first magnetic-flux transfer portion 224 and second magnetic-flux transfer portion 225.

The first coil 23A is obtained by cylindrically winding many conducting wires on the same axis as that of the first magnet 21A. The inside and outside diameters of the first coil 23A are set to dimensions almost equal to the inside and outside diameters of the first magnet 21A.

The second coil 23B is obtained by cylindrically winding many conducting wires on the same axis as that of the second magnet 21B. The inside and outside diameters of the second coil 23B are set to dimensions almost equal to the inside and outside diameters of the second magnet 21B.

The bearing 24 rotatably supports the rotor 25 with respect to the stator 22. It is preferable to form the bearing 24 of a nonmagnetic material.

As shown in FIG. 17, by fixing the first coil 23A and first magnet 21A to the outer circumferential portion of the inner cylinder 221 of the stator 22 at the same axis and the second coil 23B and second magnet 21B to the inner circumferential portion of the outer cylinder 222 at the same axis, the stator of the motor proposed by this embodiment is constituted. In this case, the first magnet 21A is set with a phase difference of 180/N° from the second magnet 21B.

Figure 18:
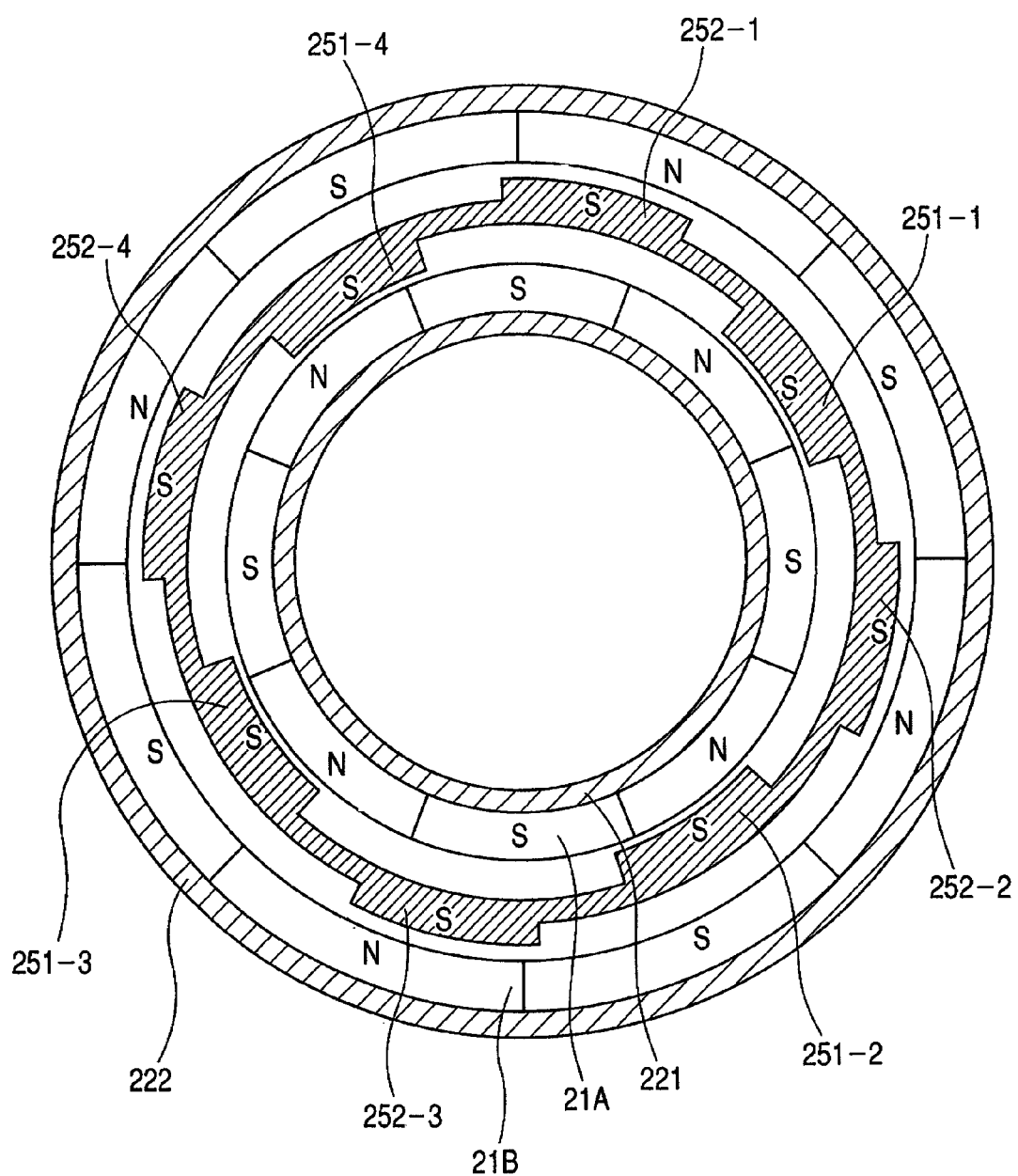
FIG. 18 is an illustration showing relations of angle positions between rotors in electrified states and the first and second magnets.
Figure 19:
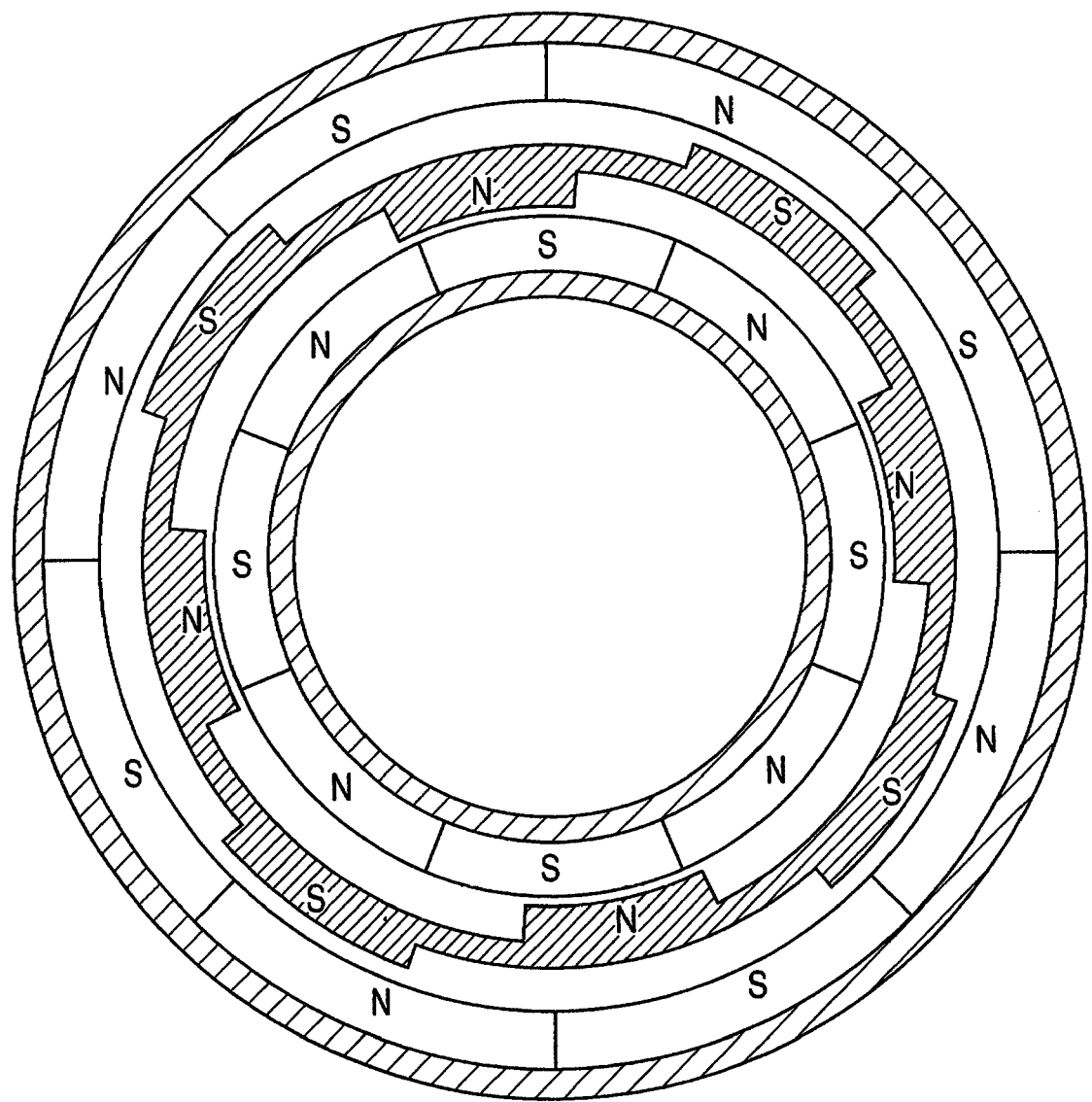
FIG. 19 is an illustration showing relations of angle positions between rotors in electrified states and the first and second magnets.
Figure 20:
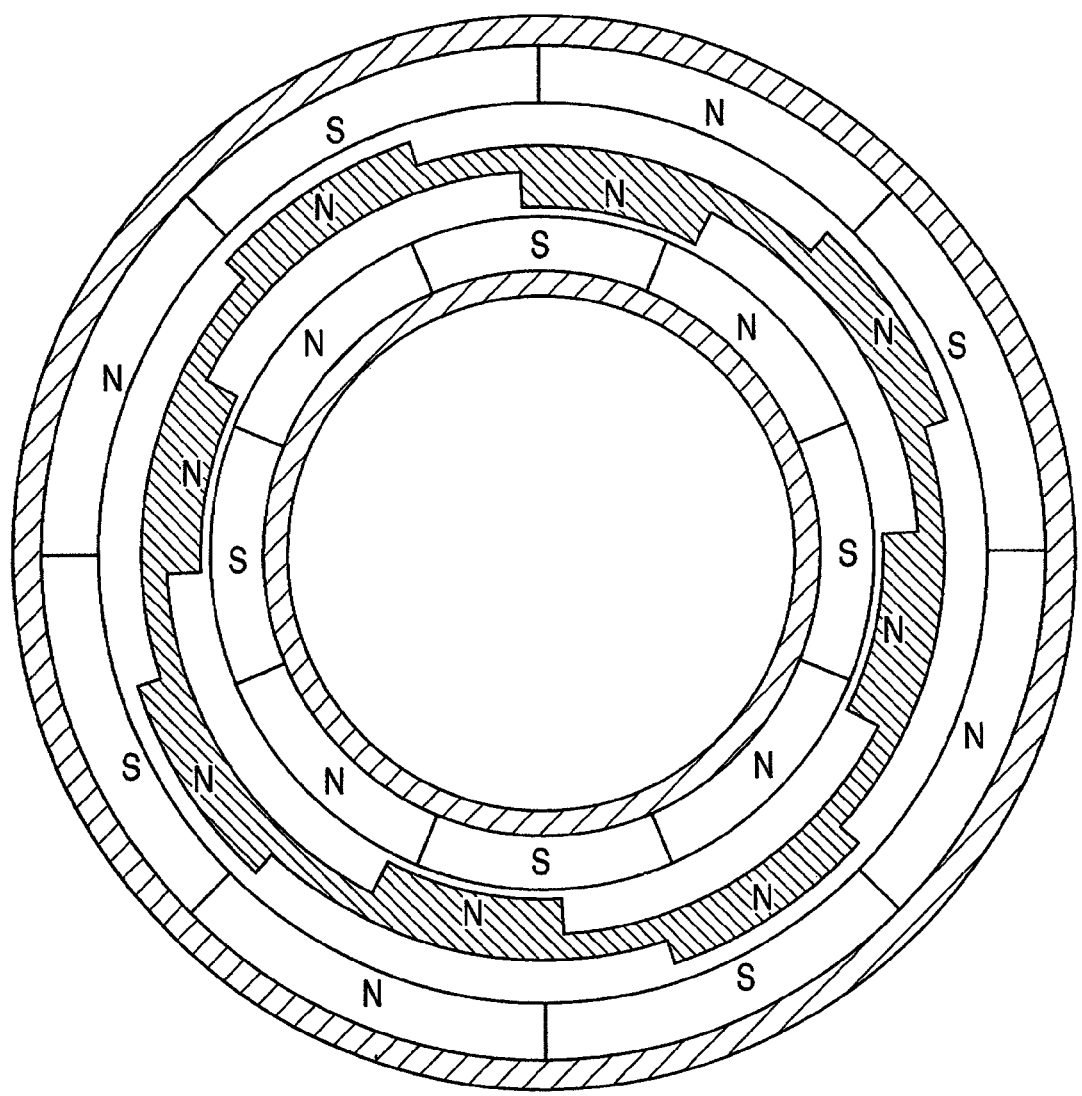
FIG. 20 is an illustration showing relations of angle positions between rotors in electrified states and the first and second magnets.
Figure 21:
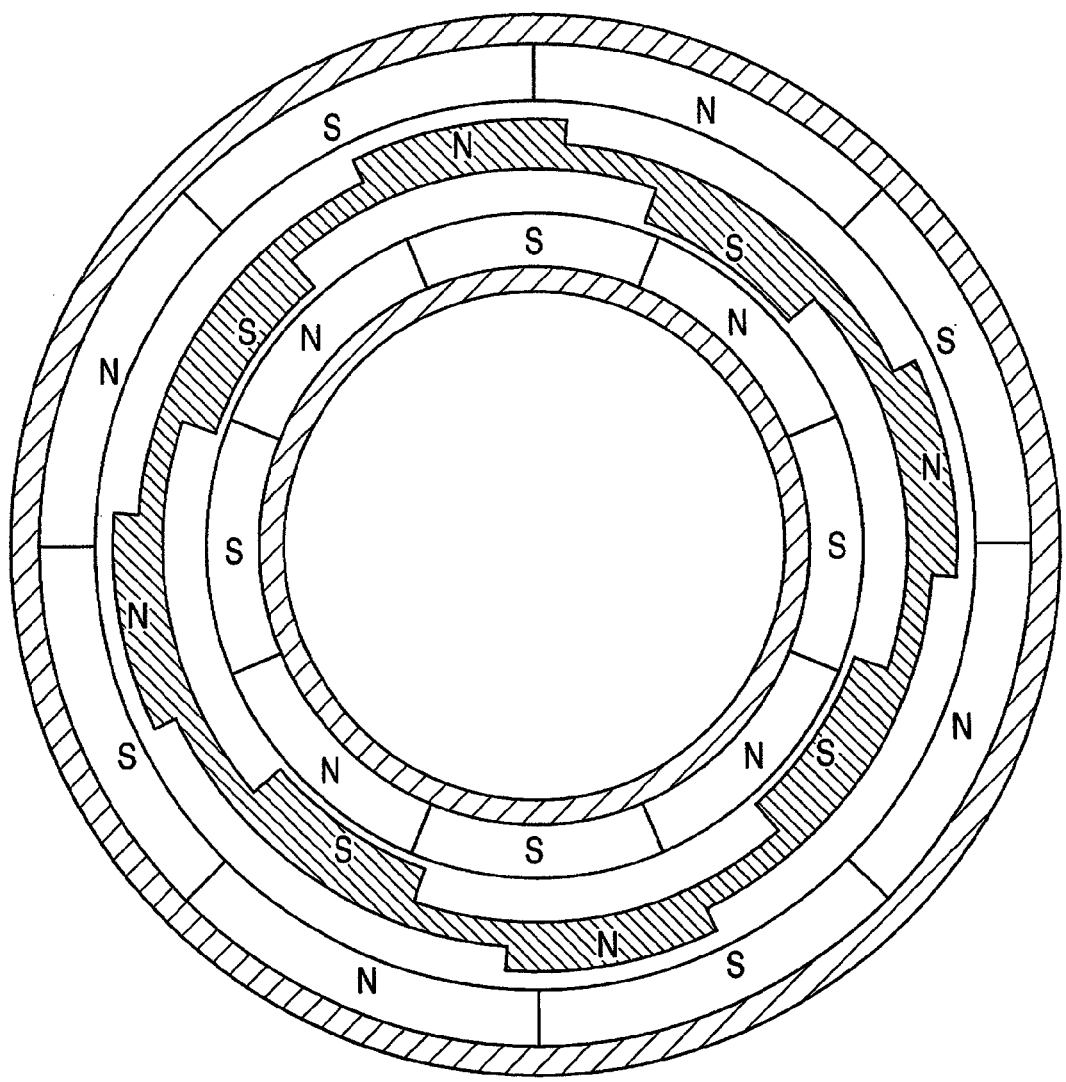
FIG. 21 is an illustration showing relations of angle positions between the rotors in electrified states and the first and second magnets.
Figure 22:
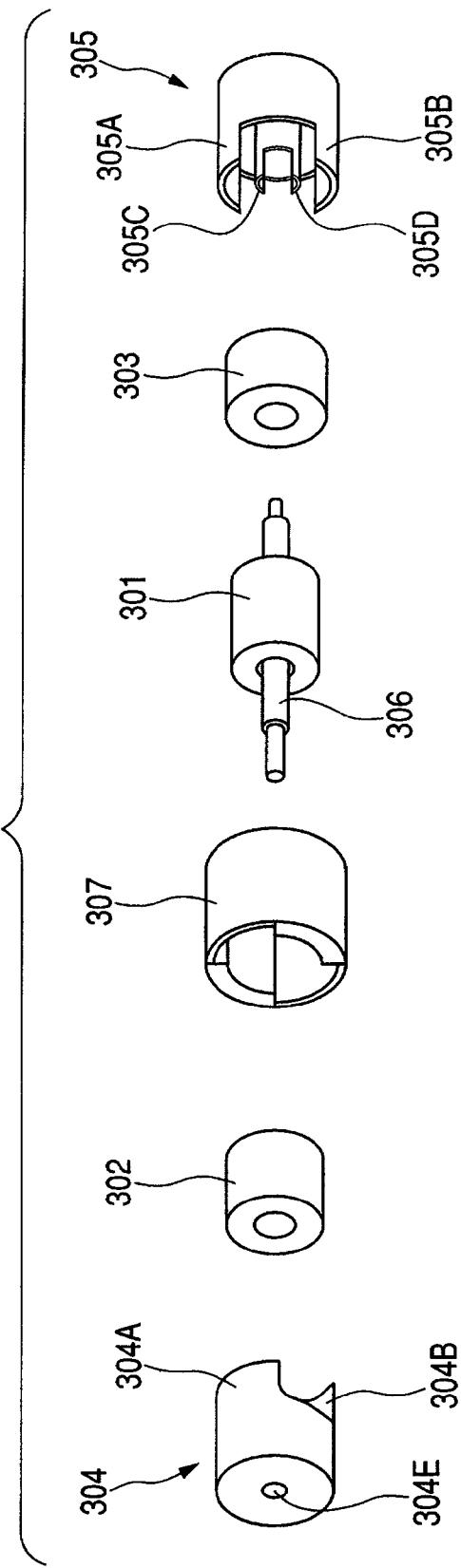
FIG. 22 is an exploded perspective view showing components of a stepping motor of a first conventional example.
Figure 23:
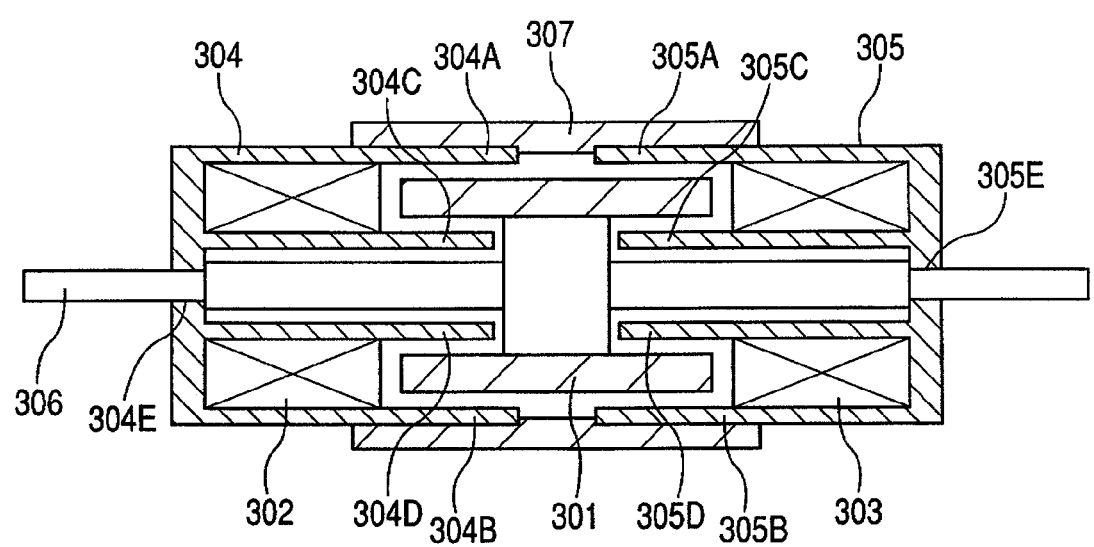
FIG. 23 is a sectional view of an already-assembled stepping motor along the axis direction.
Figure 24:
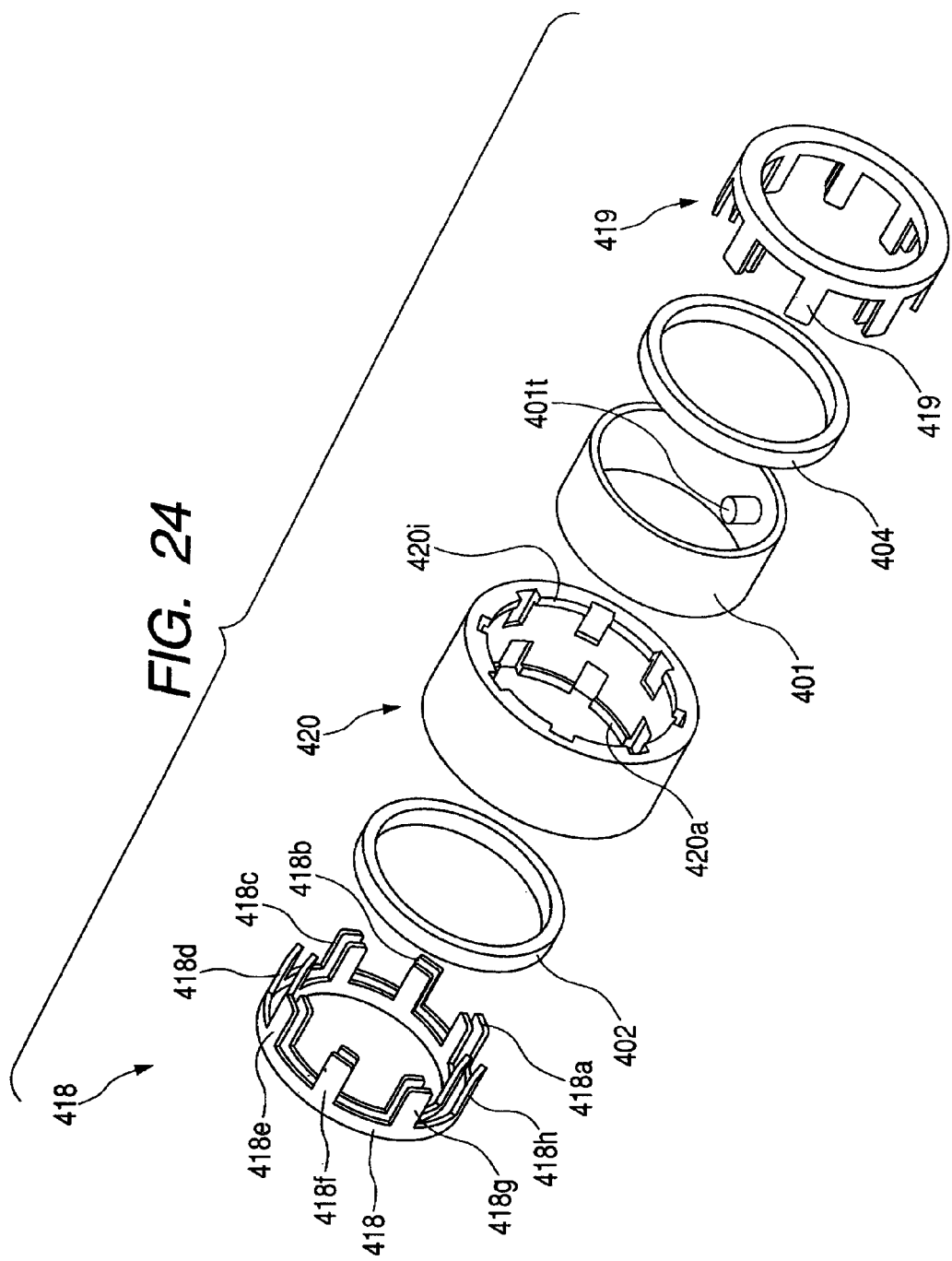
FIG. 24 is an exploded perspective view showing components of a stepping motor of a second conventional example.
Figure 25:
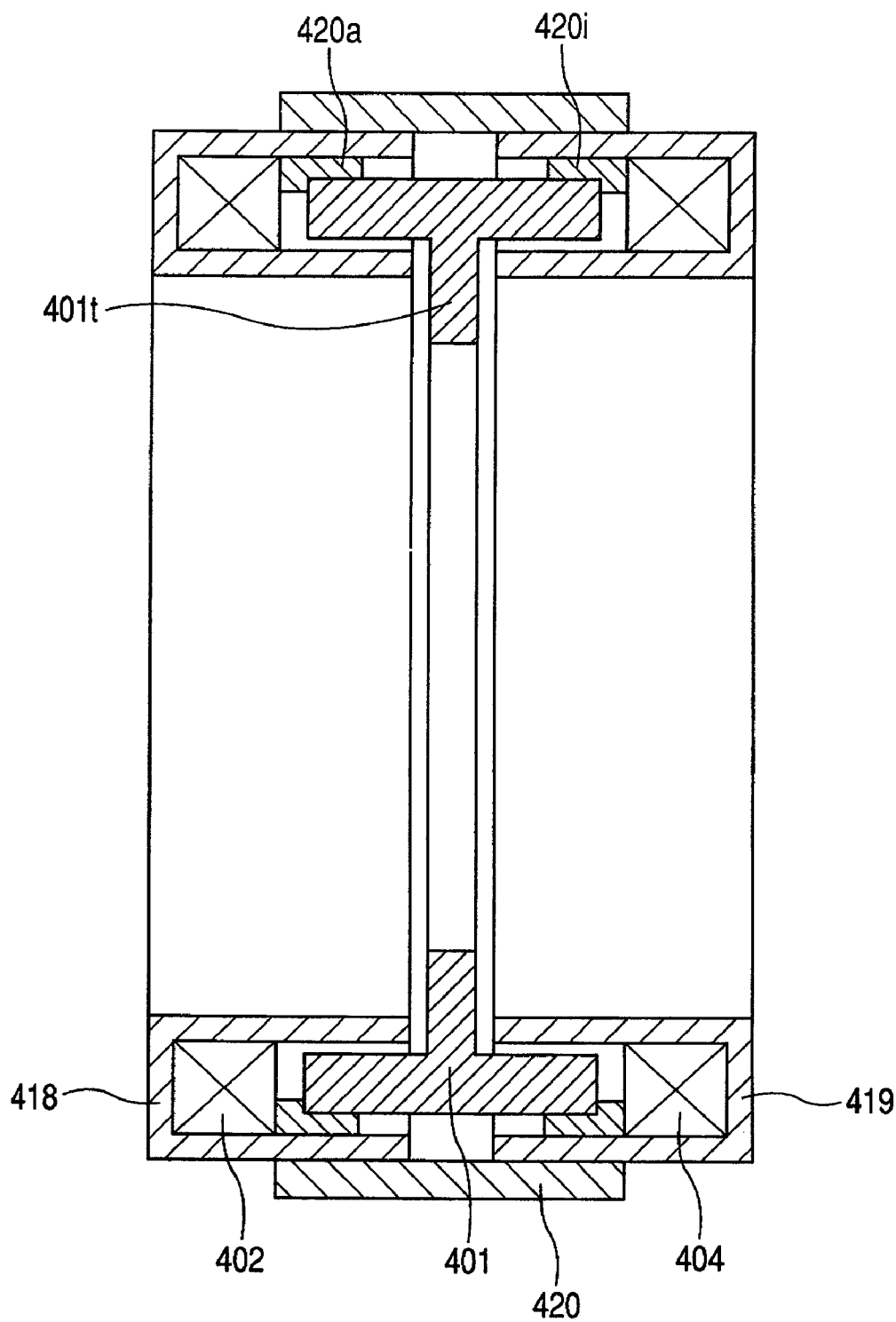
FIG. 25 is an illustration showing a structure of an already-assembled stepping motor along the axis direction.

The rotor 25 is formed of a soft magnetic material into a generally cylindrical shape. As shown in FIG. 18, the rotor 25 is provided with first magnetic pole portions 251-1, 251-2, 251-3 and 251-4 (in the following description, they are properly referred to as first magnetic portion 251) at its inner circumferential portion (in the following expression, it is properly referred to as second magnetic pole portion 252).

The number of first magnetic pole portions 251 is set to 1 or N/2. The number of the first magnetic pole portions 251 is set to 4 for this embodiment. The first magnetic pole portion 251 is formed like a convex portion at four places at equal intervals along the axis direction in the inner circumferential direction of the rotor 25 and its inner diameter is set to a dimension slightly larger than the outside diameter of the first magnet 21A. The number of second magnetic pole portions 252 is set to one to N/2. In the case of this embodiment, however, the number of second magnetic pole portions 252 is set to four. The second magnetic pole portions 252 are formed like convex poles at four places at equal intervals along the axis direction in the outer circumferential direction of the rotor 25 and their outside diameters are respectively set to a dimension slightly smaller than the inside diameter of the second magnet 21B.

The rotor 25 rotatably supported by the bearing 24 with respect to the stator 22 constitutes the rotor of the stepping motor of this embodiment. In this case, the first magnetic pole portion 251 of the rotor 25 faces the magnetized face of the first magnet 21A and the second magnetic pole portion 252 of the rotor 25 faces the magnetized face of the second magnet 21B.

Then, the driving principle of the stepping motor of this embodiment having the above configuration is described below in detail by referring to FIGS. 18 to 21.

A magnetic flux generated by electrifying the first coil 23A forms a loop making a circuit of the inner cylinder 221 of the stator 22, connecting portion 223, first magnetic transfer portion 224, first magnetic pole portion 251 of the rotor 25 and first magnet 21A and the first magnetic pole portion 251 is magnetized. It is possible to change magnetically-excited states (N pole, S pole and neutral) of the first magnetic pole portion 251 by changing the electrifying direction for the first coil 21A.

A magnetic flux generated by electrifying the second coil 23B forms a loop making a circuit of the outer cylinder 222 of the stator 22, connecting portion 223, second magnetic transfer portion 225 of the rotor 25, second magnetic pole portion 252 and second magnet 21B and the second magnetic pole portion 252 is magnetized. It is possible to change magnetically-excited states (N pole, S pole and neutral) of the second magnetic pole portion 252 by changing the electrifying direction for the second coil 21B.

A stable angle position is formed with respect to the stator 22 of the rotor 25 in accordance with the magnetic balance between the first magnetic pole portion 251 and second magnetic pole portion 252 of the magnetically-excited rotor 25 on one hand and the first magnet 21A and second magnet 21B on the other.

Similarly to the case of the above-described first to third embodiments, by changing electrifying directions for the first coil 21A and second 21B, it is possible to shift an angle at which the rotor 25 is stabilized for the stator 22. This state is shown in FIGS. 18 to 21.

FIGS. 18 to 21 are illustrations showing relations between rotors 25 in various electrified states on one hand and the first magnet 21A and second magnet 21B on the other.

FIGS. 18 to 21 show states in which the rotor 25 rotates by changing electrifying directions for the first coil 23A and second coil 23B. FIGS. 18 to 21 respectively show a cross section along the line A-A in FIG. 17.

In the case of this embodiment, by arranging the first magnets 21A and second magnets 21B on the same axis in the diameter direction, it is possible to realize a stepping motor shorter in the axis direction compared to the case of arranging magnets on the same axis in the axis direction like the case of the first to third embodiments.

Moreover, because it is possible to constitute the rotor 25 of one component, it is possible to eliminate a trouble such as overflow of an adhesive when attaching components of a rotor together by the adhesive at the time of assembling and provide a stepping motor whose quality is stabilized.

Furthermore, by using the rotor 25 having the first magnetic pole portion 251 and second magnetic pole portion 252, it is possible to decrease the moment of inertia compared to the case of a conventional rotor which constitutes a magnet.

As described above, this embodiment makes it possible to provide a stepping motor for stabilizing the quality by simplifying the configuration of a rotor and achieving high speed of rotation and improvement of response speed by decreasing the moment of inertia of the rotor.

Other Embodiment

For the above first embodiment, a case of forming four magnetic pole portions 52 at the outer circumferential portion of the rotor 5 is described as an example. However, the present invention is not restricted to the above case. It is allowed that the number of magnetic pole portions ranges between 1 and N/2 (N: number of poles of a magnet).

For the above second embodiment, a case of forming four first magnetic pole portions 72 and four second magnetic pole portions 73 at the outer circumferential portion of the rotor 7 is described as an example. However, the present invention is not restricted to the above case. It is allowed that the number of magnetic pole portions ranges between 1 and N/2 (N: number of poles of a magnet).

For the above third embodiment, a case of setting the rotor 15 to the outermost diameter portion of a stepping motor. However, the present invention is not restricted to the above case. It is allowed to use a structure in which a rotor is set to the innermost diameter portion of a stepping motor.

For the above fourth embodiment, a case of forming four first magnetic pole portions 251 and four second magnetic pole portions 252 at the inner circumferential portion and outer circumferential portion of the rotor 25. However, the present invention is not restricted to the above case. It is allowed that the number of magnetic pole portions ranges between 1 and N/2 (N: number of poles of a magnet).

This application claims priority from Japanese Patent Application No. 2005-218968 filed on Jul. 28, 2005, which is hereby incorporated by reference herein.

What is claimed is:

1. A driving apparatus comprising:
    a first cylindrically shaped magnet whose outer circumferential surface is alternately magnetized as different polarities in the circumferential direction;
    a second cylindrically shaped magnet whose outer circumferential surface is alternately magnetized as different polarities in the circumferential direction;
    a rotor integrally formed with magnetic pole portions made of a soft magnetic material, the rotor having a cylindrical shape, and a plurality of notched portions formed on circumferential surfaces of the rotor, the magnetic pole portions being comprised on portions between the plurality of notched portions, the magnetic pole portions of the rotor being opposite to outer circumferential surfaces of the first cylindrically shaped magnet and the second cylindrically shaped magnet;
    wherein the first and the second cylindrically shaped magnets are fixed to a stator;
    a first coil fixed to the stator to magnetically excite a portion opposite to the first cylindrically shaped magnet at the magnetic pole portions of the rotor; and
    a second coil fixed to the stator to magnetically excite a portion opposite to the second cylindrically shaped magnet at the magnetic pole portions of the rotor,
    wherein the stator has cylindrical shape, a first magnetic-flux transfer portion and a second magnetic-flux transfer portion are serially provided on the stator along an axis of the stator,
    the first cylindrically shaped magnet and the first coil are fixed between one end of the stator and the first magnetic-flux transfer portion, and
    the second cylindrically shaped magnet and the second coil are fixed between another end of the stator and the second magnetic-flux transfer portion.

2. The driving apparatus according to claim 1, wherein each of the magnetic pole portions of the rotor has a cut off portion at both sides near a center of a directional axis.

* * * * *